(12) United States Patent
Vij et al.

(10) Patent No.: US 11,144,865 B2
(45) Date of Patent: Oct. 12, 2021

(54) DELIVERY PLATFORM FOR REAL-TIME LOCATIONS

(71) Applicant: Accenture Global Solutions Limited, Dublin (IE)

(72) Inventors: Meetika Vij, Jaipur (IN); Hemant Manaharlal Kakkad, Mumbai (IN); Sreyas Subramaniam Sankaranarayanan, Thiruvananthapuram (IN); Madhuri Uddhavrao Kumbhar, Pune (IN); Reena Shinde, Pune (IN); Nitin Kumar Gupta, Ghaziabad (IN)

(73) Assignee: Accenture Global Solutions Limited, Dublin (IE)

( * ) Notice: Subject to any disclaimer, the term of this patent is extended or adjusted under 35 U.S.C. 154(b) by 544 days.

(21) Appl. No.: 15/798,047

(22) Filed: Oct. 30, 2017

(65) Prior Publication Data

US 2019/0019135 A1    Jan. 17, 2019

(30) Foreign Application Priority Data

Jul. 12, 2017 (IN) .............................. 201711024544

(51) Int. Cl.
*G06Q 10/08* (2012.01)
(52) U.S. Cl.
CPC .................................. *G06Q 10/083* (2013.01)
(58) Field of Classification Search
CPC .................................................... G06Q 10/083
See application file for complete search history.

(56) References Cited

U.S. PATENT DOCUMENTS 7,225,983 B2    6/2007 Park et al.
8,340,978 B2   12/2012 Wade
(Continued)

FOREIGN PATENT DOCUMENTS

WO          2016039882 A1  †  3/2016
WO       WO2016039882         3/2016
(Continued)

OTHER PUBLICATIONS

Yongsung Kim, Libero: On-the-go Crowdsourcing for Package Delivery, 2015, p. 1-2 (Year: 2015).*
(Continued)

*Primary Examiner* — Kevin H Flynn
*Assistant Examiner* — Ibrahim N El-Bathy
(74) *Attorney, Agent, or Firm* — Fish & Richardson P.C.

(57) ABSTRACT

Implementations are directed to receiving delivery order data for delivery of the tangible asset, the delivery order data including a unique identifier associated with a mobile device of a recipient, receiving evidence data from the mobile device of the recipient, providing an order record stored in a distributed ledger system, the order record including at least a portion of the delivery order data, and the evidence data, determining that the tangible asset is to be handed over to the recipient, and in response: collecting delivery evidence data, providing the delivery evidence data for comparison to the evidence data, and receiving a validation result based on the comparison, and selectively indicating that the tangible asset has been handed over to the recipient at least partially based on the validation result, and updating the order record stored in the distributed ledger system.

27 Claims, 24 Drawing Sheets

(56) References Cited

U.S. PATENT DOCUMENTS

| | | | |
|---|---|---|---|
| 9,699,606 B1* | 7/2017 | Bhatia | G06K 19/06 |
| 2003/0125963 A1 | 7/2003 | Haken | |
| 2004/0148295 A1 | 7/2004 | Stevens | |
| 2004/0243430 A1 | 12/2004 | Horstemeyer | |
| 2009/0012802 A1 | 1/2009 | Pinney | |
| 2009/0127327 A1 | 5/2009 | Rani | |
| 2009/0292682 A1 | 11/2009 | Robbins | |
| 2011/0125664 A1 | 5/2011 | Kadaba | |
| 2011/0166878 A1 | 7/2011 | Louie et al. | |
| 2014/0180959 A1 | 6/2014 | Gillen et al. | |
| 2014/0279664 A1 | 9/2014 | Lievens et al. | |
| 2015/0120094 A1 | 4/2015 | Kimchi et al. | |
| 2015/0227890 A1 | 8/2015 | Bednarek et al. | |
| 2016/0068264 A1* | 3/2016 | Ganesh | G06Q 10/0833 701/2 |
| 2016/0098723 A1* | 4/2016 | Feeney | G06Q 20/4016 705/75 |
| 2016/0350861 A1 | 12/2016 | Loughlin-Mchugh et al. | |
| 2017/0308847 A1* | 10/2017 | Todd | G06Q 10/087 |
| 2019/0158493 A1* | 5/2019 | Aronoff | G06F 21/32 |

FOREIGN PATENT DOCUMENTS

| | | | |
|---|---|---|---|
| WO | 2016171617 A1 † | 10/2016 | |
| WO | WO2016171617 A1 * | 10/2016 | G06Q 10/00 |

OTHER PUBLICATIONS

AU Office Action in Australian Appln. No. 2018-203571, dated Feb. 13, 2019, 6 Pages.

AU Office Action in Australian Appln. No. 2018-203571, dated Jul. 5, 2018, 25 Pages.

CA Office Action in Canadian Appln. No. 3,005,267, dated Mar. 21, 2019, 7 pages.

CA Office Action in Canadian Application No. 3,005,267, dated Jan. 27, 2020, 4 pages.

IN Office Action in Indian Application No. 201711024544, dated Feb. 19, 2020, 8 pages.

Fetchr.us [online], "Fetchr," available on or before Apr. 17, 2015 via Internet Archive: Wayback Machine URL<https://web.archive.org/web/20150417031815/https://www.fetchr.us/>, retrieved on Jun. 1, 2021, retrieved from URL<https://www.fetchr.US/>, 7 pages.

Issuu.com [online], "Logistics News," May 1, 2016, retrieved on Jun. 1, 2021, retrieved from URL<https://webcache.googleusercontent.com/search?q=cache:RSV3T7P-m7MJ:https://issuu.com/logisticsnewsme/docs/lnme_may 2016+&cd=17&hl=en&ct=clnk&gl=in>, 40 pages.

Route4Me.com [online], "Domino's To Use GPS Tracking On Customers," dated Jun. 15. 2016. retrieved on Jun. 1, 2021, retrieved from URL <https://blog.route4me.com/dominos-use-gps-tracking/>, pages.

TaxiMobility.com [online]. "Delivery Assistance—Courier software designed to improve and optimize transit jobs," available on or before Sep. 17, 2016 via Internet Archive: Wayback Machine URL<https://web.archive.org/web/20160917021614/https://www.taximobility.com/courier-delivery-software.htmb, retrieved on June 1. 2021 via Internet Archive: Wayback Machine capture dated Dec. 25, 2016, retrieved from URL<https://web.archive.org/web/20161225153634/https://www. taximobility.com/courier-delivery-software.html>, 4 pages.

TechCentral.co.za [online], "SA start-up will deliver to you, wherever you are," Jan. 16, 2017, retrieved on Jun. 1, 2021, retrieved from URL<https://techcentral.co.za/sa-start-up-will-deliver-to-you-wherever-you-are/71155/, 4 pages.

\* cited by examiner

† cited by third party

DELIVERY PLATFORM FOR REAL-TIME LOCATIONS

CROSS-REFERENCE TO RELATED APPLICATION

This application claims priority to Indian Patent Application No. 201711024544, filed on Jul. 12, 2017, entitled "DELIVERY PLATFORM FOR REAL-TIME LOCATIONS," the entirety of which is hereby incorporated by reference.

BACKGROUND

Delivery service providers, such as postal services, deliver assets, such as letters, packages, and the like from senders to recipients. Traditionally, delivery service providers deliver assets to fixed addresses. Example addresses can include a home address, a business address, and a post office (P.O.) box. In some instances, if the recipient is not present at the time of delivery, the delivery service provider cannot deliver the asset, and a subsequent re-delivery process is performed to attempt delivery at a later point in time. In some instances, the recipient has to collect the asset themselves from a location of the delivery service provider (e.g., from a post office). Each of these instances illustrate limitations and inefficiencies of traditional asset delivery processes.

SUMMARY

Implementations of the present disclosure are generally directed to delivery of tangible assets by a delivery service provider from a sender to a recipient. More particularly, implementations of the present disclosure are directed to a platform for delivery of tangible assets to a recipient's real-time location, and providing immutable proof-of-delivery.

In some implementations, actions include receiving delivery order data for delivery of the tangible asset, the delivery order data including a unique identifier associated with a mobile device of a recipient, receiving evidence data from the mobile device of the recipient, providing an order record stored in a distributed ledger system, the order record including at least a portion of the delivery order data, and the evidence data, determining that the tangible asset is to be handed over to the recipient, and in response: collecting delivery evidence data, providing the delivery evidence data for comparison to the evidence data, and receiving a validation result based on the comparison, and selectively indicating that the tangible asset has been handed over to the recipient at least partially based on the validation result, and updating the order record stored in the distributed ledger system. Other implementations of this aspect include corresponding systems, apparatus, and computer programs, configured to perform the actions of the methods, encoded on computer storage devices.

These and other implementations can each optionally include one or more of the following features: a delivery mode comprises location-based delivery based on a location of the mobile device of the recipient; actions further include determining that the location of the mobile device of the recipient is within a predefined range of a distribution point, from which the tangible asset is to be delivered, and in response, providing an indication to a delivery agent that the tangible asset is to be delivered to the location; actions further include: performing at least one validation check based on the delivery order data, and receiving an indication that the at least one validation check has passed, and in response, transmitting a notification to the mobile device of the recipient to confirm the recipient's acceptance of the delivery order; the at least one validation check includes a sender validation, package validation, and recipient validation; actions further include, during delivery of the tangible asset, determining that a delivery mode has changed, and in response, updating delivery of the tangible asset to the delivery mode; the delivery mode is changed from a fixed address to the location-based delivery; the evidence data includes biometric data that is at least partially unique to the recipient; collecting delivery evidence data includes capturing the delivery evidence data using a mobile device of a delivery agent delivering the tangible asset to the recipient; and a type of the delivery evidence data is of the same type of the evidence data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to delivery of tangible assets by a delivery service provider from a sender to a recipient. More particularly, implementations of the present disclosure are directed to a platform for delivery of tangible assets to a recipient's real-time location, and providing immutable proof-of-delivery (also referred to as the location-based delivery platform).

As described in further detail herein, implementations of the present disclosure include actions of receiving delivery order data for delivery of the tangible asset, the delivery order data including a unique identifier associated with a mobile device of a recipient, receiving evidence data from the mobile device of the recipient, providing an order record stored in a distributed ledger system, the order record including at least a portion of the delivery order data, and the evidence data, determining that the tangible asset is to be handed over to the recipient, and in response: collecting delivery evidence data, providing the delivery evidence data for comparison to the evidence data, and receiving a validation result based on the comparison, and selectively indicating that the tangible asset has been handed over to the recipient at least partially based on the validation result, and updating the order record stored in the distributed ledger system.

Figure 1:
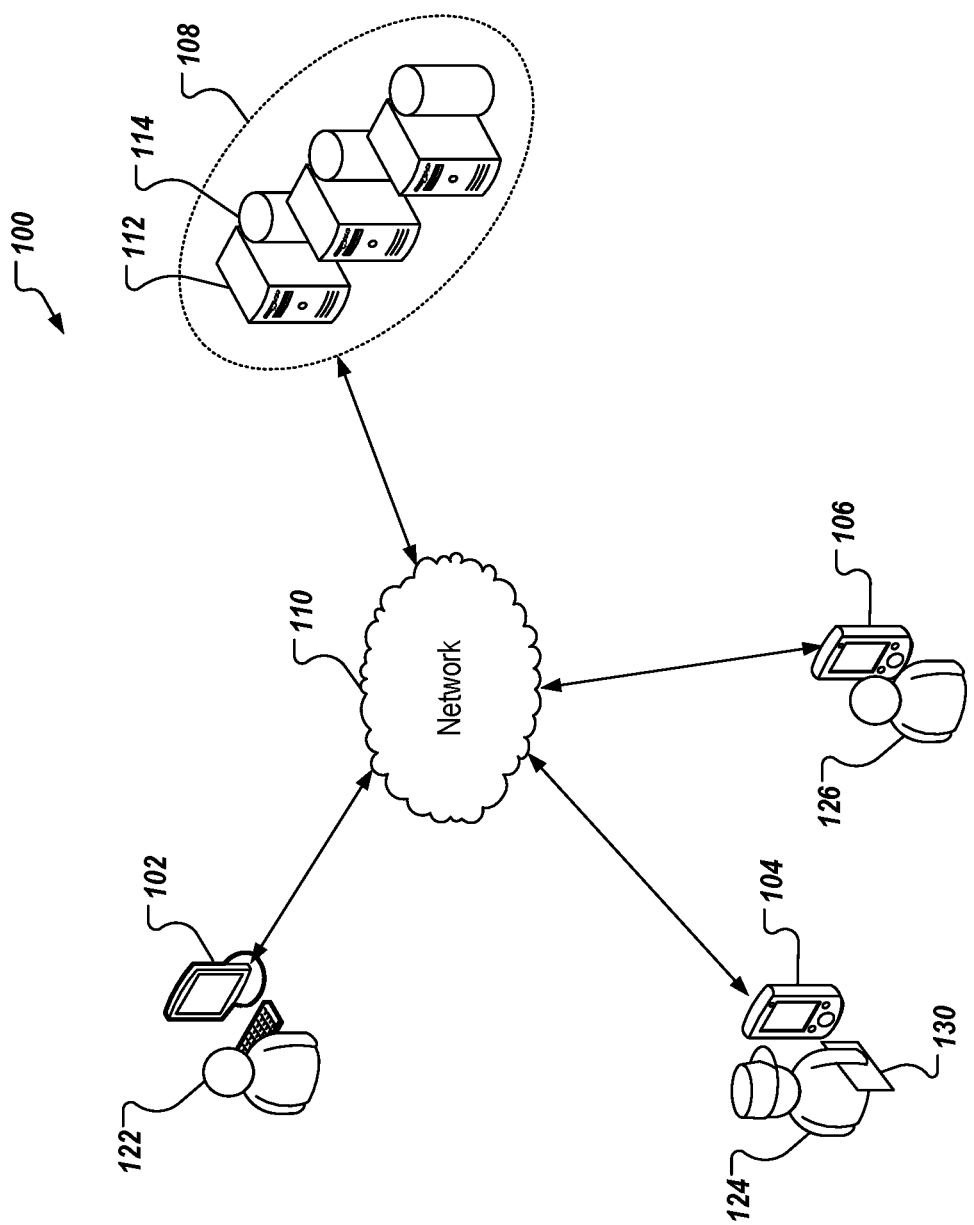
FIG. 1 depicts an example high-level architecture in accordance with implementations of the present disclosure.

FIG. 1 depicts an example system 100 that can execute implementations of the present disclosure. The example system 100 includes computing devices 102, 104, 106, a back-end system 108, and a network 110. In some examples, the network 110 includes a local area network (LAN), wide area network (WAN), the Internet, or a combination thereof, and connects web sites, devices (e.g., the computing device 102, 104, 106), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a computer-implemented platform for delivery of tangible assets to a recipient's real-time location, and providing immutable proof-of-delivery in accordance with implementations of the present disclosure.

In some examples, the computing devices 102, 104, 106 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the computing devices 102, 104, 106 are used by users 122, 124, 126, respectively. In accordance with the example context, the user 122 is an agent of a sender (e.g., a commercial enterprise) that is to send a tangible asset 130 using a delivery service provider. The user 122 uses the computing device 102 to access and interact with the platform for delivery of tangible assets to a recipient's real-time location, which is hosted on the back-end system 108. In the depicted example, the user 124 is an agent of a delivery service provider (DSP) (e.g., a post office) that is tasked with delivery of the asset 130. In the depicted example, the user 126 is a recipient, to whom the asset 130 is to be delivered using the location-based delivery platform of the present disclosure.

In general, and as described in further detail herein, implementations of the present disclosure enable location-based delivery of tangible assets to recipients. More particularly, the location-based delivery platform of the present disclosure uses real-time location signals (e.g., GPS, wifi) for address (location) of the delivery, and ensures first-try delivery by tracking the recipient's location, so that the delivery attempt is successful. The location-based delivery platform of the present disclosure also enables the recipient to update their location. Immutable proof-of-delivery is also provided. For example, a distributed ledger system (DLS) (e.g., Blockchain) is used to record proof-of-delivery, so that the record of delivery is immutable. Accordingly, implementations of the present disclosure eliminate dependency on a permanent (fixed) address for delivery, and reduce cost and resource consumption associated with redelivery, and/or storage by ensuring first-try delivery.

Implementations of the present disclosure provide multiple phases. Example phases include order and acceptance, travel, and delivery. In some examples, and as described in further detail herein, order and acceptance includes a sender (e.g., the user 122) providing delivery details of an asset to a DSP, the order details being communicated to a recipient (e.g., the user 126), who accepts or rejects the delivery. If the recipient accepts the delivery, travel includes an agent of the DSP (e.g., the user 124) picking-up the asset, and routing the asset to the recipient. In some examples, and as described in detail herein, during travel, the recipient's location (and/or delivery preference) may change. Accordingly, implementations of the present disclosure enable such dynamics to be accounted for, such that the asset is appropriately delivered to the recipient. In some examples, and as described in further detail herein, delivery includes actual conveyance of the asset from the agent to the recipient, and the collection of proof-of-delivery evidence, which is recorded to the DLS.

Figure 2:
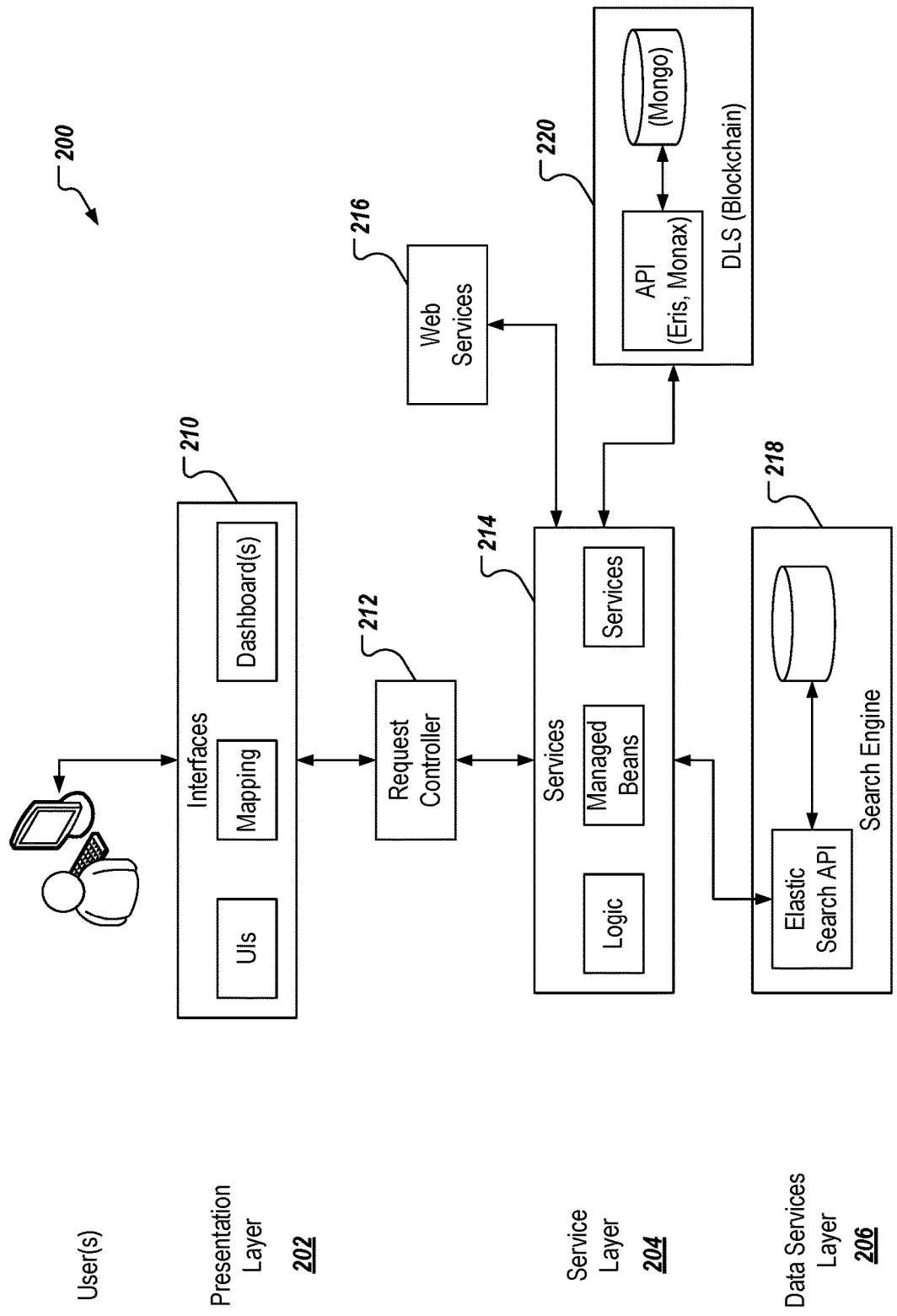
FIG. 2 depicts example layers in accordance with implementations of the present disclosure.

FIG. 2 depicts example layers 200 in accordance with implementations of the present disclosure. The example layers 200 include a presentation layer 202, a service layer 204, and a data services layer 206. In some examples, a user (e.g., the user 122, 124, 126 of FIG. 1) interacts with the presentation layer 202 to access data (e.g., using the computing device 102, 104, 106 of FIG. 1). In some implementations, the presentation layer 202 includes interfaces 210 including a plurality of components (e.g., user interface(s), mapping service(s), dashboard(s)). In some examples, the components are provided as JavaServer Faces (JSF) components. In some implementations, the presentation layer 202 interacts with the service layer 204 through a request controller 212. In some examples, the request controller 212 is provided as a servlet that manages the request processing lifecycle for web applications that are being used to construct the components of the presentation layer 202. An example request controller 212 includes the Java Faces-Servlet.

In some implementations, the service layer 204 provides access to one or more web-based services (e.g., web services, social networking services), and the data services layer 206. In some examples, the service layer 204 provides access to services and logic 214 that are performed to provide implementations of the present disclosure. For example, delivery logic can be provided, which provides workflows for actions of order and acceptance (e.g., inputting order details, communicating with recipient), travel (e.g., tracking delivery status, updating location and/or delivery mode), and delivery (e.g., recording proof-of-delivery evidence). As another example, one or more external web services 216 can be accessed (e.g., mapping services). In some implementations, the data services layer 206 provides access to a search engine including an elastic search application program interface (API) and one or more search indices. In some examples, the data services layer 206 receives a query from the service layer 204, and processes the query to provide a result. In some examples, the service layer 204 also includes a DLS service 220 (e.g., Blockchain), which can be used to provide immutable proof-of-delivery, as described herein.

Figure 3:
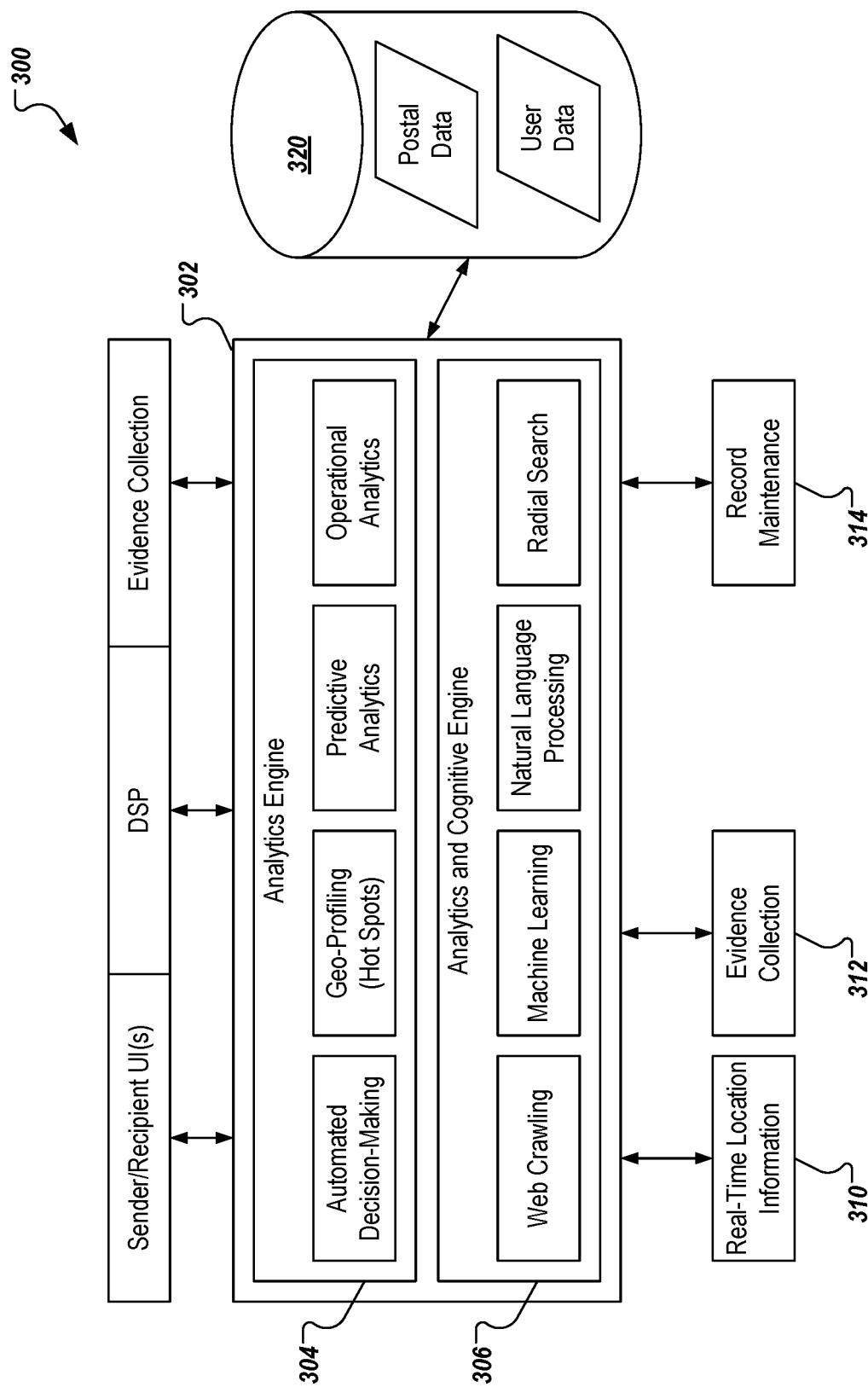
FIG. 3 depicts an example platform in accordance with implementations of the present disclosure.

FIG. 3 depicts an example platform 300 in accordance with implementations of the present disclosure. The example platform 300 includes an analytics platform 302 that includes an analytics engine 304, and an analytics and cognitive engine 306. In some examples, the analytics platform 302 receives data from a plurality of data sources. Example data includes real-time location information 310 (e.g., location-based device data), evidence collection data 312, and record maintenance data 314. Example real-time location information 310 includes location signals (e.g., GPS, wifi) of recipient devices to determine a recipient's location. Example evidence collection data 312 includes evidence data (e.g., biometrics data) provided by recipients for use as proof-of-delivery, as described herein. Example record maintenance data 314 can include delivery records for in-progress (pending) delivery orders, and/or completed delivery orders. In some implementations, the example platform 300 also includes one or more external databases 320. In the depicted example, one or more external databases can provide postal data, and/or user data. In some implementations, and as described herein, the analytics platform 302 processes the real-time location information 310, the evidence collection data 312, and the record maintenance data 314, as well as data from the database(s) 320 to provide real-time, location based delivery in accordance with the present disclosure.

Figure 4A:
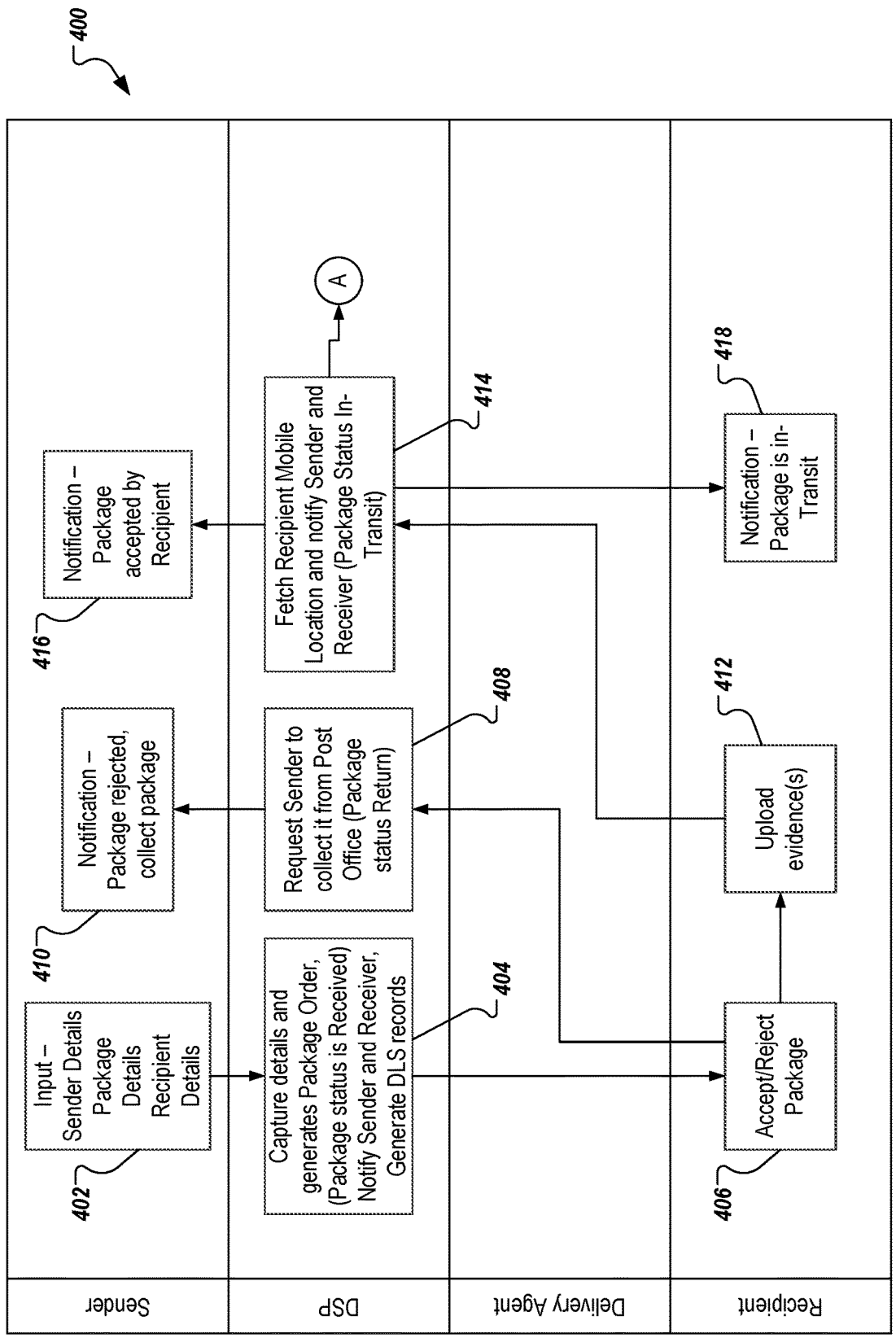
FIGS. 4A-4C depict an example process that can be executed in implementations of the present disclosure.
Figure 4B:
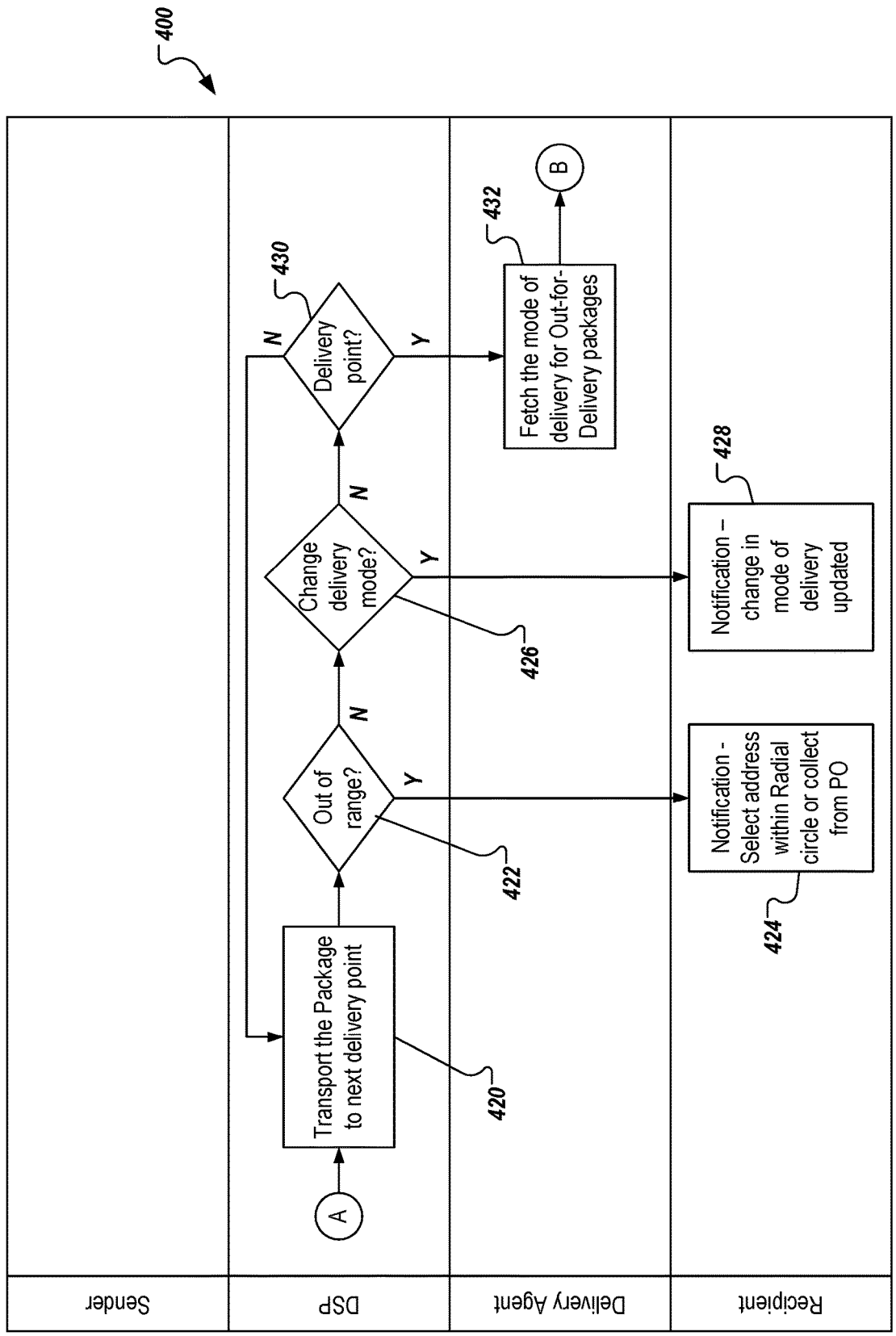
Figure 4C:
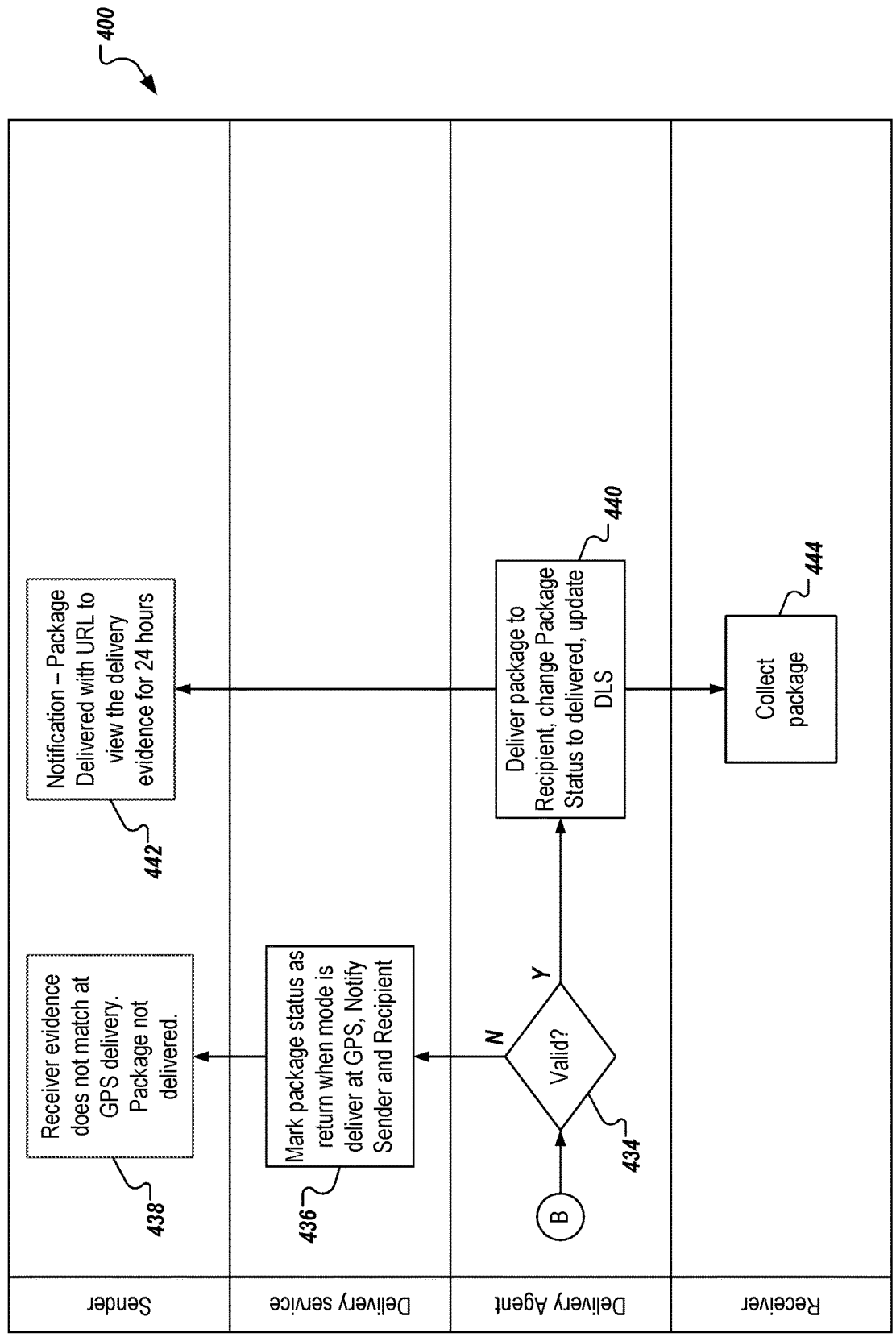

FIGS. 4A-4C depict an example process 400 that can be executed in implementations of the present disclosure. In some examples, the example process 400 is provided using one or more computer-executable programs executed by one or more computing devices (e.g., the back-end system 108 of FIG. 1). The example process 400 can be executed to provide location-based delivery in accordance with implementations of the present disclosure. The examples of FIGS. 4A-4C depicts actions based on actors. Example actors include a sender (e.g., an enterprise sending an asset to a recipient), as represented by the user 122 of FIG. 1, a DSP (e.g., a postal service), a delivery agent (e.g., postman), as represented by the user 124 of FIG. 1, and a recipient, as represented by the user 126 of FIG. 1.

With particular reference to FIG. 4A, delivery details are input (402). For example, the sender inputs delivery details to the location-based delivery platform using a computing device. Example delivery details include sender details (e.g., name, address, account number), package details (e.g., type, size, weight, contents), and recipient details (e.g., name, address). In accordance with implementations of the present disclosure, the package details further include an image (uploaded digital image) of the package (asset) that is to be delivered, the sender details further include a device identifier assigned to a location-traceable device, and the recipient details further include a device identifier assigned to a location-traceable device. An example device includes a mobile telephone that is held by the recipient, and an example device identifier includes an X-digit (e.g., 10-digit) number assigned to the mobile telephone.

The delivery details are received, a delivery order is generated, both the sender and the recipient are notified, and a DLS entry is recorded (404). For example, the DSP receives the delivery details, and performs one or more validation checks. Example validation checks include sender validation, package validation, and receiver validation. In some examples, sender validation includes confirming that the received sender details are complete, and accurate. For example, the device identifier as the X-digit (e.g., 10-digit) number provided as recipient details is validated by determining whether the X-digit number is active, is traceable, is located within a respective locale (e.g., country, state, county, and/or city) of the intended delivery, and that the sender-number and receiver-number are not the same. In some examples, to determine whether a located within range of a locale, a radial search (e.g., Elastic radial search) is performed to calculate a distance of the device having the device identifier (mobile number). As another example, a one-time password (OTP) can be transmitted to the device, and if the OTP is delivered successfully, the device can be determined to be active. As another examples, traceability of the device can be determined based on with a GPS location provided through a respective API (e.g., Google API). As another example, package validation includes determining that the package is of a type, size, and weight that is appropriate for delivery, and/or that the package is at a location (or within range of the location) for pick-up. In some examples, a machine-readable code (e.g., bar code, QR code) can be provided on the package, which can be scanned and decoded to auto-fill package information for validation.

If any of the sender validation, package validation, and/or receiver validation fails (e.g., the recipient-number is not active) a failure-error message is provided to the sender. In some examples, the sender can resubmit information to address the failure, or can abandon delivery of the package. If each of the sender validation, package validation, and/or receiver validation is successful, the delivery order is generated, and a notification is sent to the sender and the recipient. In some examples, the notification to the sender can recite at least a portion of the delivery details, and can indicate confirmation that the delivery order has been entered. In some examples, the notification to the recipient is sent as an electronic message to the device using the X-digit number (e.g., as a text message). In some examples, the notification includes at least a portion of the delivery details.

The recipient accepts or rejects the delivery order (406). For example, the notification sent to the recipient upon order generation requests that the user accept, and/or reject the delivery order. For example, the notification can provide "If you accept this delivery order, please respond Y. If you reject this delivery order, please respond N." If the recipient rejects the delivery order, a notification is sent to the sender, and the delivery order is cancelled. In some examples, a notification can be sent to the recipient (e.g., confirming that the delivery order has been cancelled). In some examples, if the package has already been picked-up by the DSP, the DSP sends a request to the sender to collect the package from a particular locale (e.g., post office) (408), the sender receiving the notification (410).

In some examples, if the delivery order is accepted by the recipient, the recipient is requested to upload proof-of-delivery evidence. For example, if the recipient response "Y" to the notification, a subsequent electronic message instructs the recipient to capture evidence that can be subsequently used for proof-of-delivery. Example evidence can include an image selected, and/or taken by the recipient, and/or biometric evidence. For example, the recipient can select an image that can be subsequently used to verify that the recipient is who they purport to be, when taking delivery of the package (e.g., the recipient presents an image to the delivery agent, and, if the presented image matches the image originally provided, the recipient is authenticated. In some examples, biometric evidence can include facial recognition evidence, voice recognition evidence, thumbprint evidence, and the like. An example image can include an image of the recipient (e.g., a "selfie"), which can be used to compare to a subsequent image of the recipient (e.g., an image taken at delivery) for facial recognition comparison (e.g., is the face in the originally provided image the same as that in the subsequently provided image). The evidence provided by the recipient is received, and is recorded (e.g., as an entry in the DLS).

The recipient's location is determined, the sender is notified, the recipient is notified, and the delivery status is updated to in-transit (e.g., indicating that the package is to be delivered) (414). The sender receives the notification (e.g., that delivery has been accepted by the recipient, and the package is in-transit) (416), and the recipient receives the notification (e.g., that the package is in-transit) (418).

The package is transported from an origin to a destination. In accordance with implementations of the present disclosure, the destination can include a current location of the recipient (e.g., GPS location of a device of the recipient), a fixed address, or a locale (e.g., recipient's local post office). In some examples, the destination can change, while the package is in transit. For example, the order can indicate that the package is to be delivered to a fixed address of the recipient (e.g., home address), and can be collected by the delivery agent from the sender, or otherwise taken to an initial distribution point (e.g., the sender's local post office). In some examples, and as described in further detail herein, the delivery mode can be changed by the recipient. For example, the recipient can indicate that, instead of the fixed address, the delivery mode is to be real-time, location-based delivery using the recipient's location (e.g., GPS location of the recipient's device). Transporting the package can include movement from an origination point (e.g., the sender's location, the initial distribution point) to a final distribution point (e.g., before delivery to recipient), and can include one or more intermediate distribution points in-between.

Continuing with FIG. 4B, the package is transported to a distribution point (420). For example, the package can be transported to a distribution point (e.g., post office) that is nearest to the recipient's last known location. It can be determined whether the recipient is out-of-range of delivery for location-based delivery (422). For example, the recipient's current location can be determined (e.g., GPS location of the recipient's device), and can be compared to a predefined delivery range for the current distribution point. If the recipient is out-of-range, a notification is sent to the recipient (424). For example, an electronic message (e.g., email, text) can be sent to the recipient. In some examples, the notification can indicate that the recipient is to select an address within the predefined range for delivery, or indicate that the recipient is to collect the package from the delivery.

In some examples, it can be determined whether the delivery mode has changed (426). For example, the recipient can log into the location-based delivery platform, and can access a user interface to change delivery mode, as described in further detail herein. For example, the recipient can change the delivery mode from a fixed address delivery to a real-time location delivery. This can occur, for example, if the recipient realizes that they will be away from the fixed address when the delivery is to occur, and instead opt for real-time, location-based delivery of the present disclosure. If the delivery mode has changed, the recipient is notified (428). For example, if the recipient changes the delivery mode, a confirmation is provided indicating that the recipient's requested change has been confirmed.

It is determined whether the package is at a delivery point (430). That is, for example, it is determined whether the package has reached a distribution point, form which local transport is to be performed based on the current delivery mode. For example, a delivery agent (e.g., postal worker), loads packages for local distribution. If the package is not at the delivery point, the example process 400 loops back for continued transport of the package.

If the package is at the delivery point, the status of the package is set to out-for-delivery, and the delivery mode is determined (432). The package is delivered based on the delivery mode, and validation of the recipient is performed (434). For example, if the delivery mode is collection by the recipient (e.g., form the local post office), or delivery to a fixed address the recipient is validated (authenticated) upon pick-up/delivery. As another example, if the delivery mode is real-time location delivery to the recipient, the recipient is validated (authenticated) at the location.

In some examples, validation includes collecting proof-of-delivery evidence at the time of delivery to compare to the previously submitted proof-of-delivery evidence (e.g., stored in the DLS). For example, if the recipient had provided biometric evidence upon accepting the order for delivery (e.g., 412 of FIG. 4A), the same type of biometric evidence can be collected for comparison. As noted above, example biometric evidence can include facial recognition based on an image (e.g., selfie) that the recipient had previously provided. At the time for delivery, the delivery agent can capture an image of the person claiming to be the recipient. Facial recognition can be performed as between the two images, and it can be determined (e.g., by a facial recognition system) whether the faces captured in the respective images are the same. If the proof-of-delivery evidence(s) match, the package is given to the recipient, and the information is recorded in the DLS (440, 442, 444). In some examples, if the proof-of-delivery evidence(s) do[es] not match, the package is not delivered, and the package is returned to the sender (e.g., the package status is set to return) (436, 438).

Figure 5A:
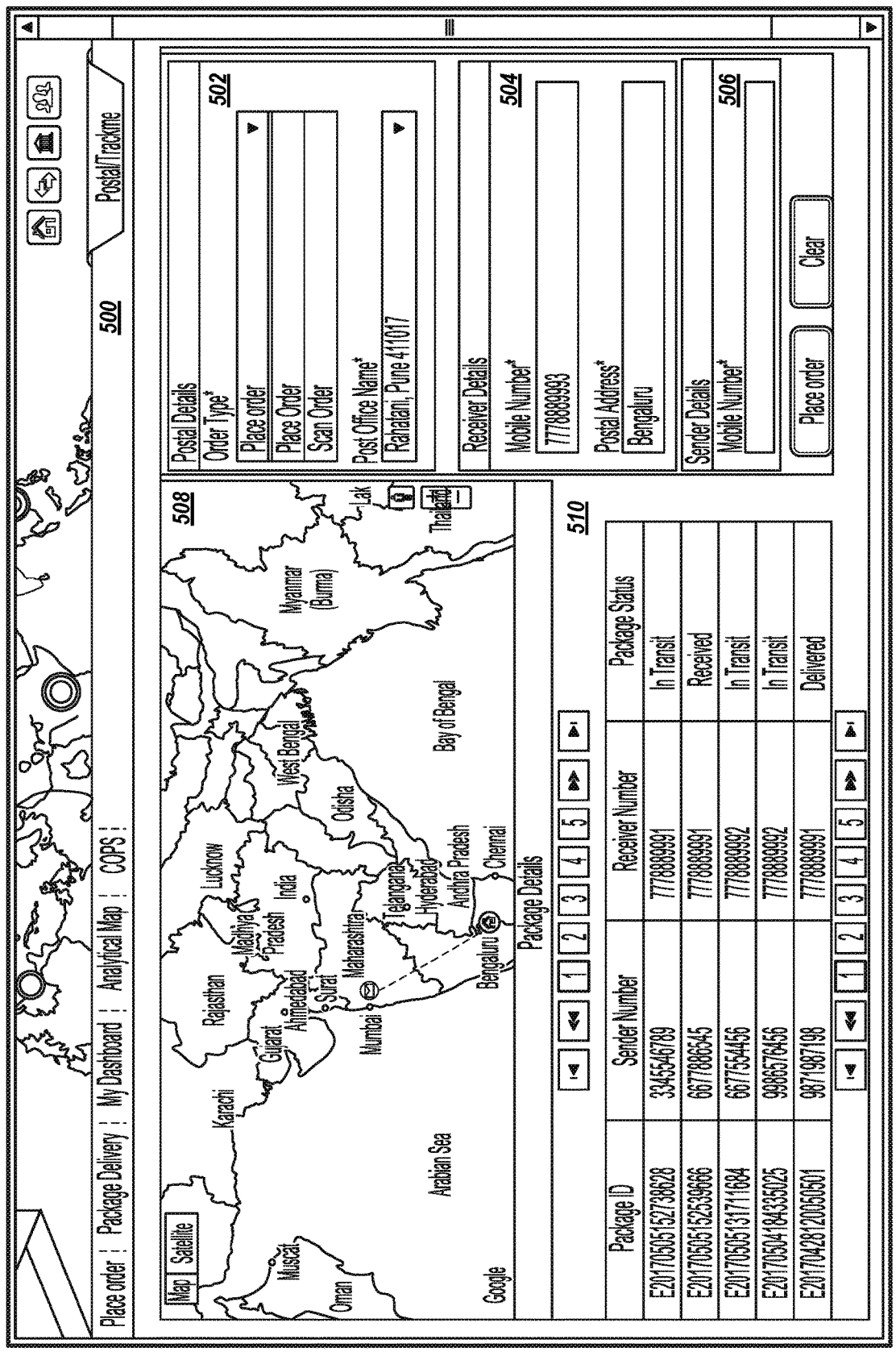
FIGS. 5A-5R depict example graphical user interfaces (GUIs) that can be used in implementations of the present disclosure.
Figure 5B:
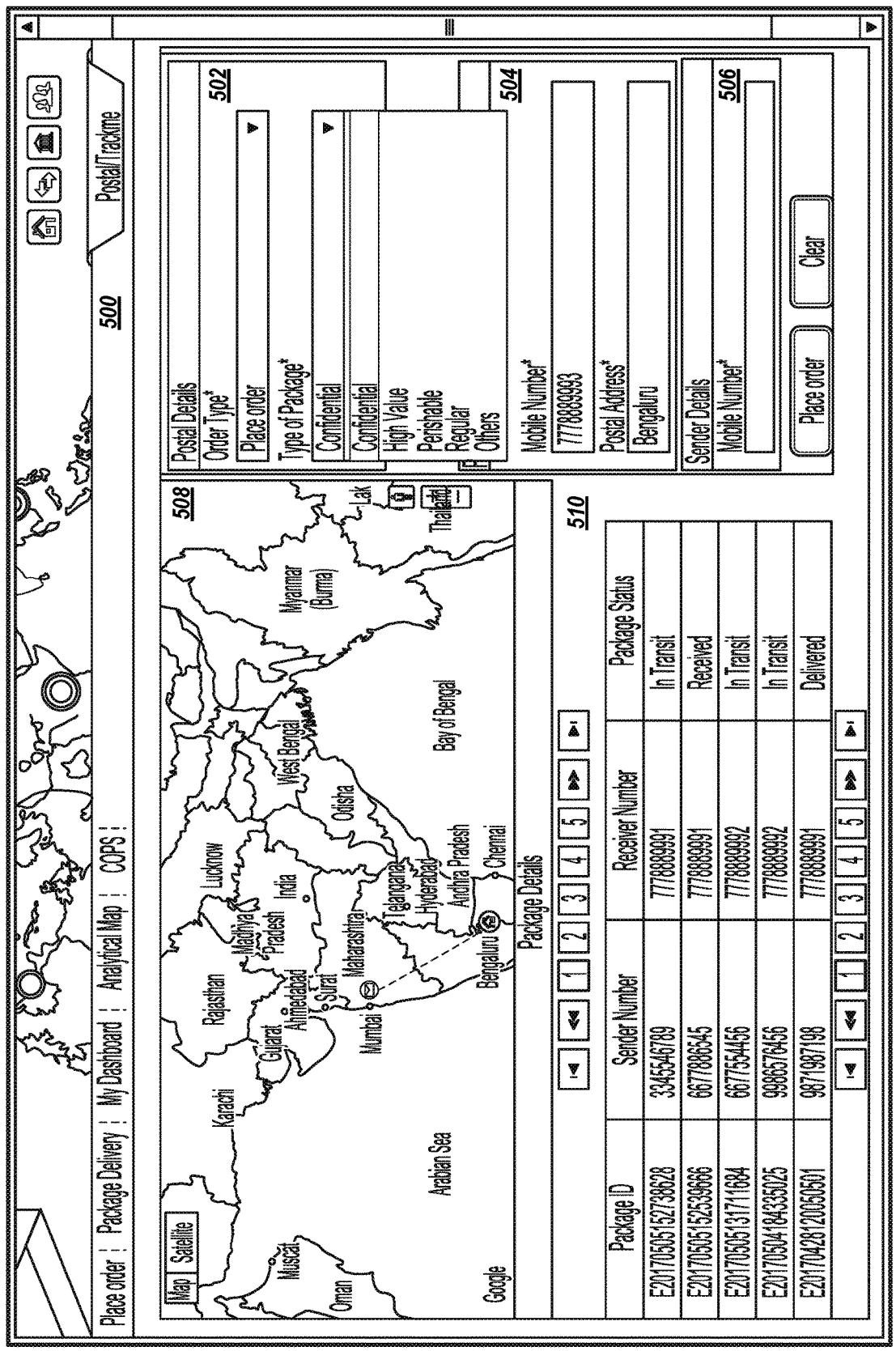
Figure 5C:
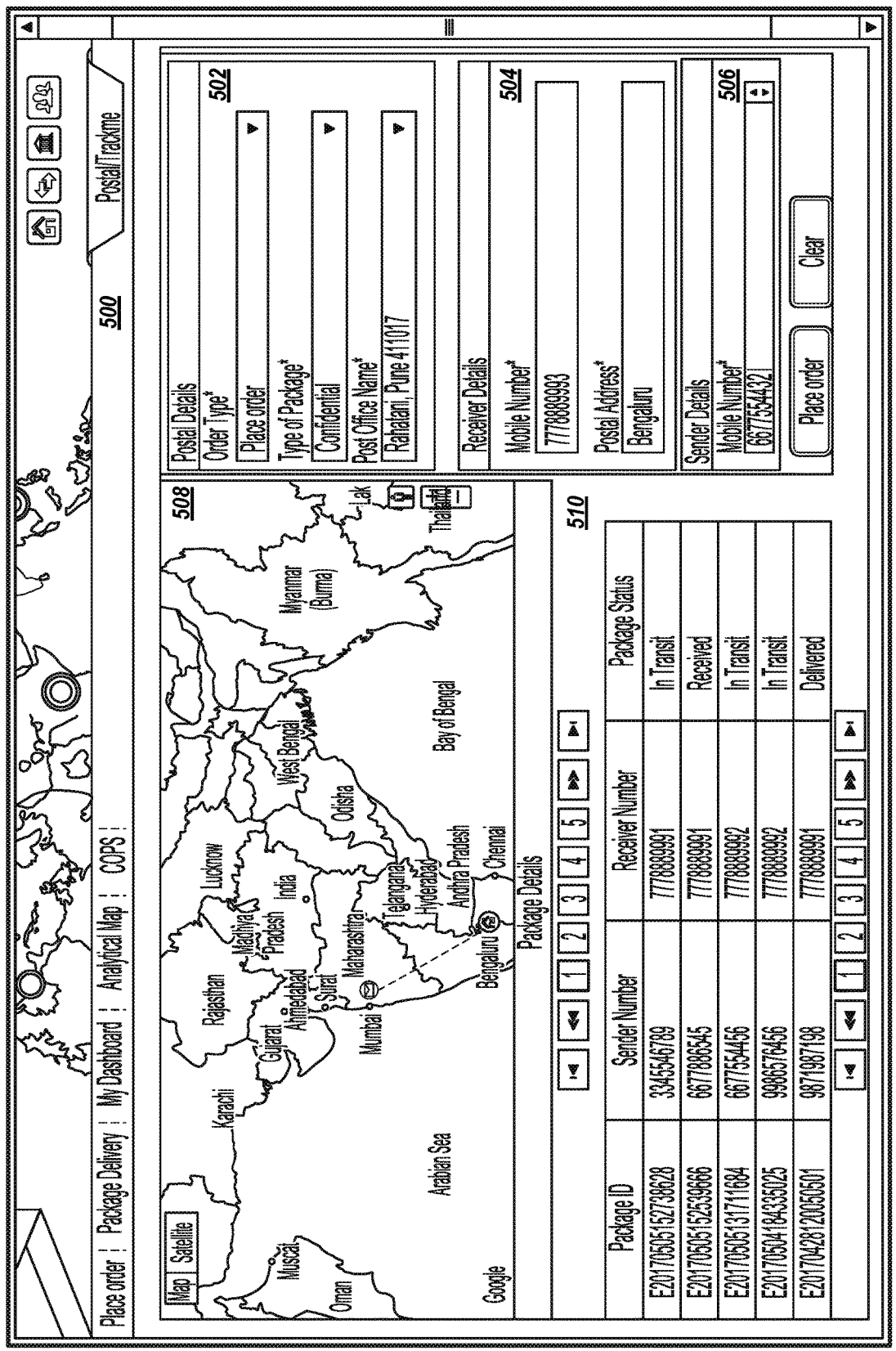
Figure 5D:
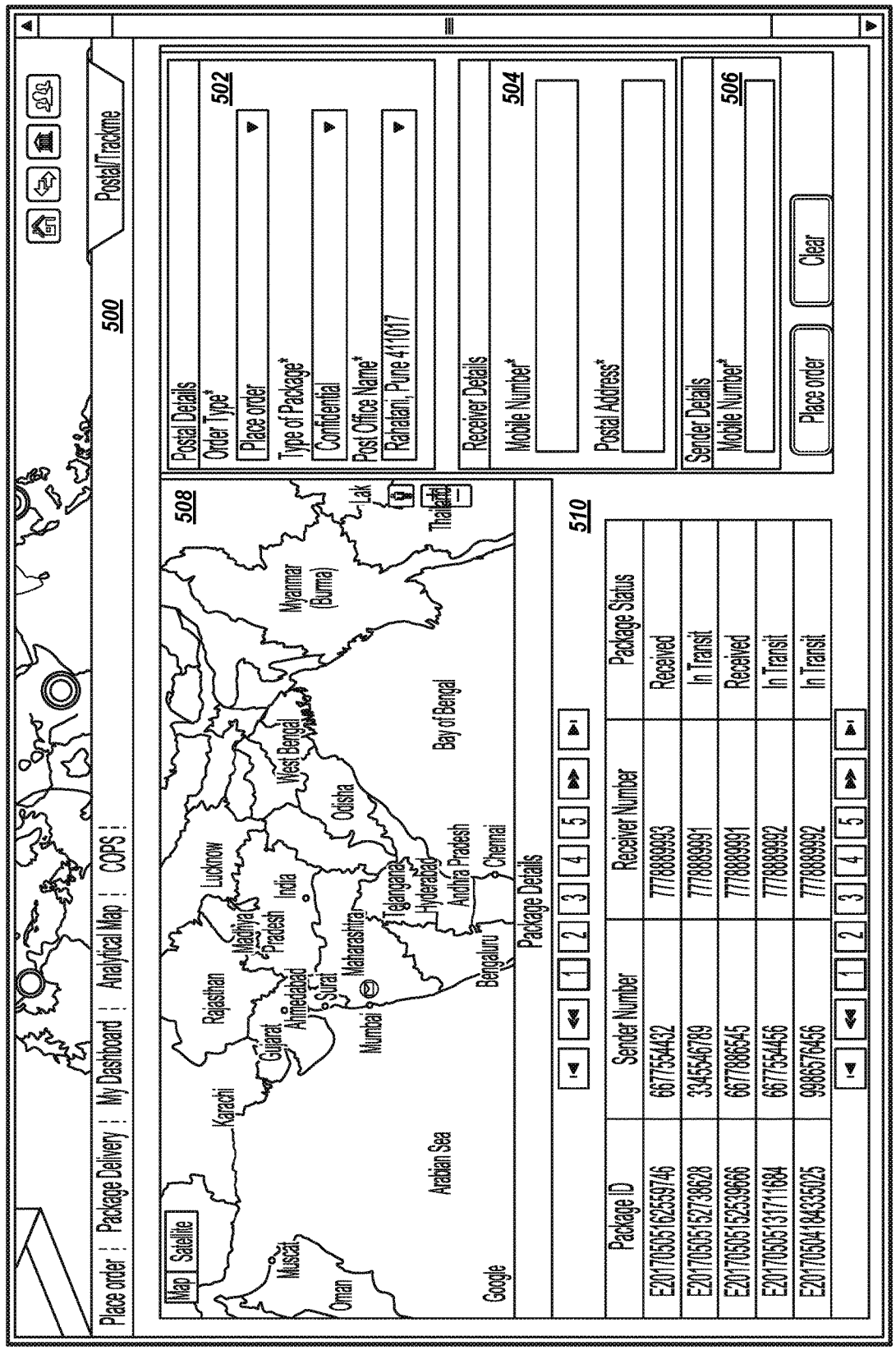
Figure 5E:
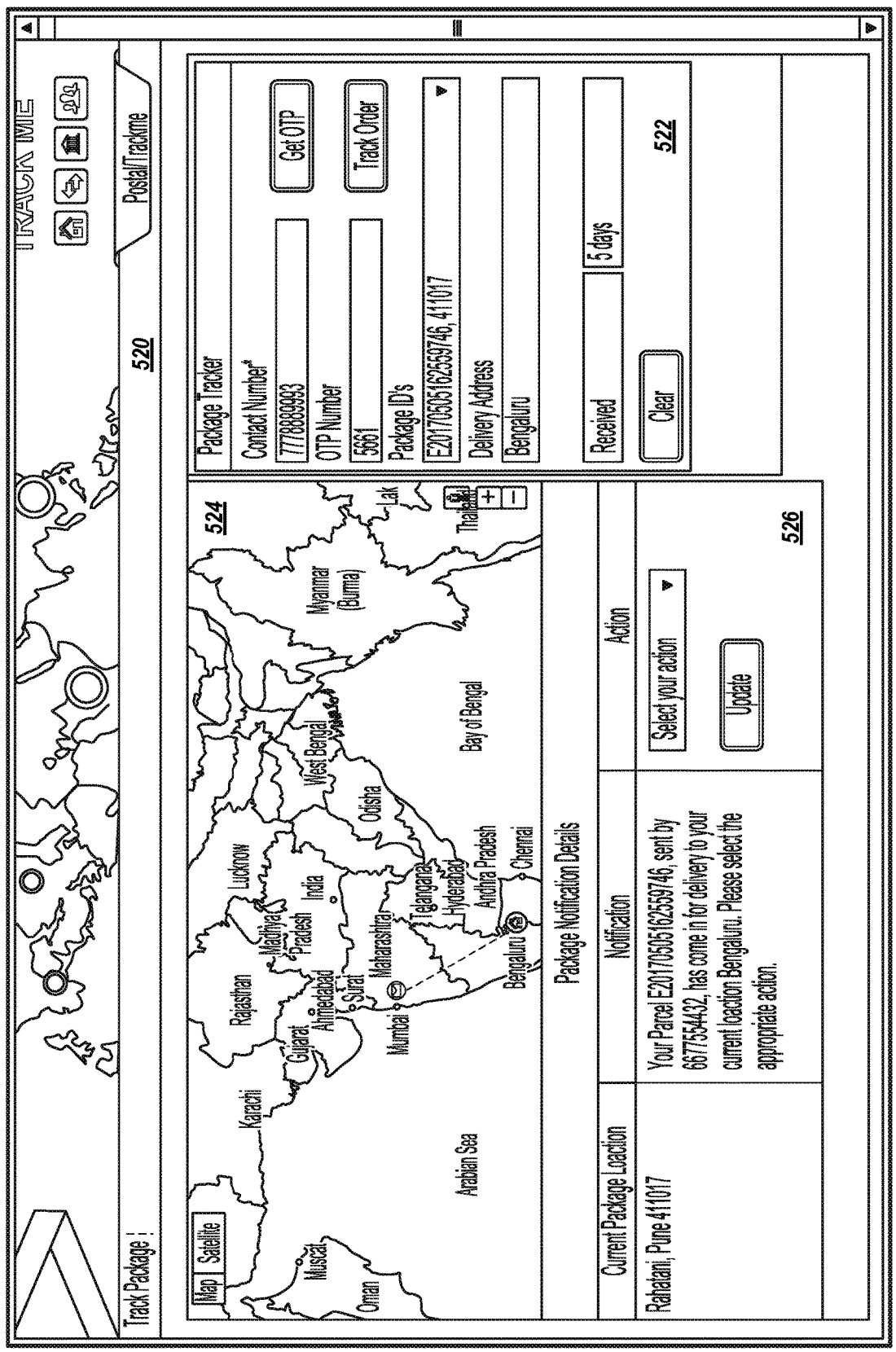
Figure 5F:
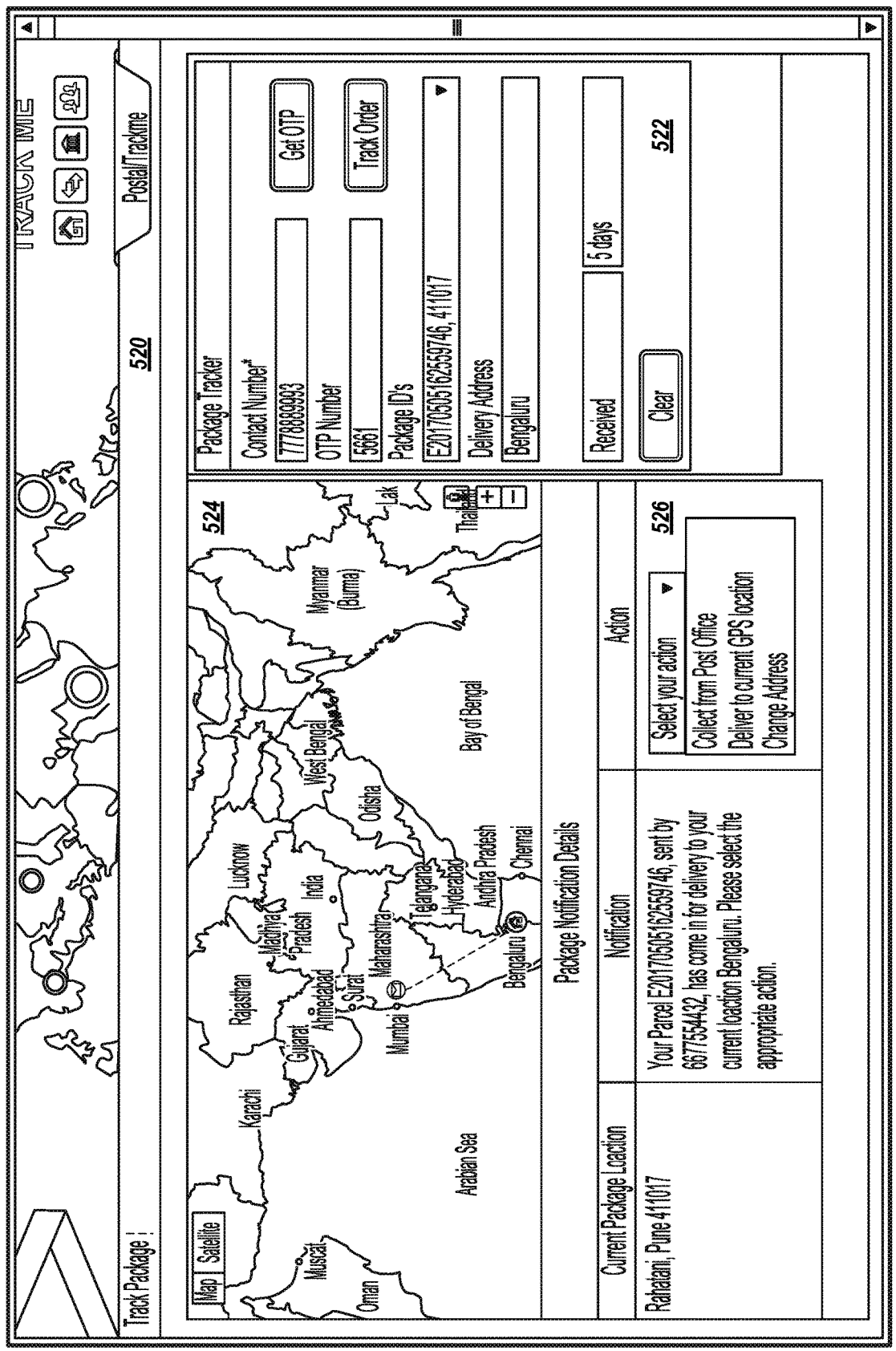
Figure 5G:
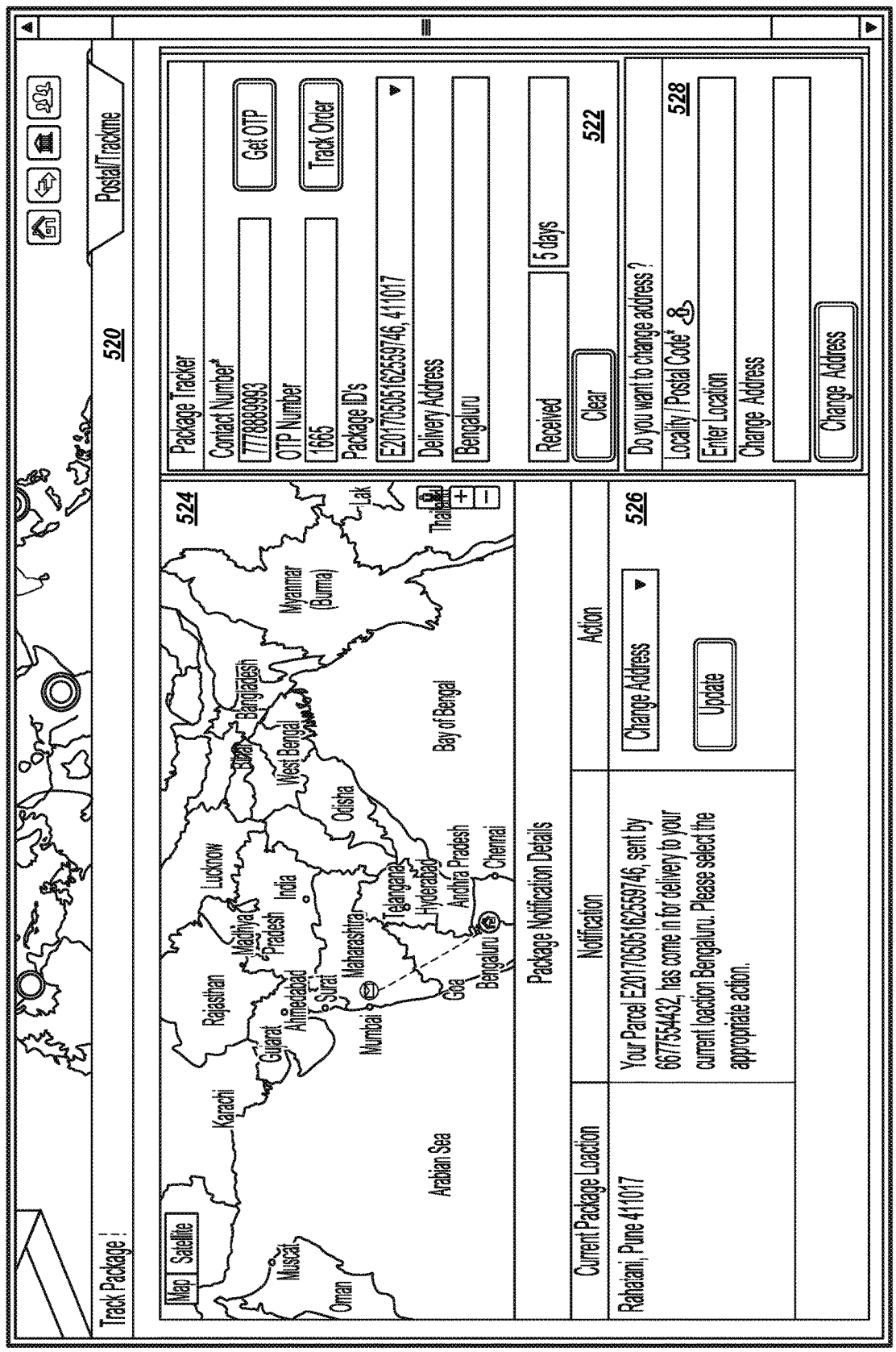
Figure 5H:
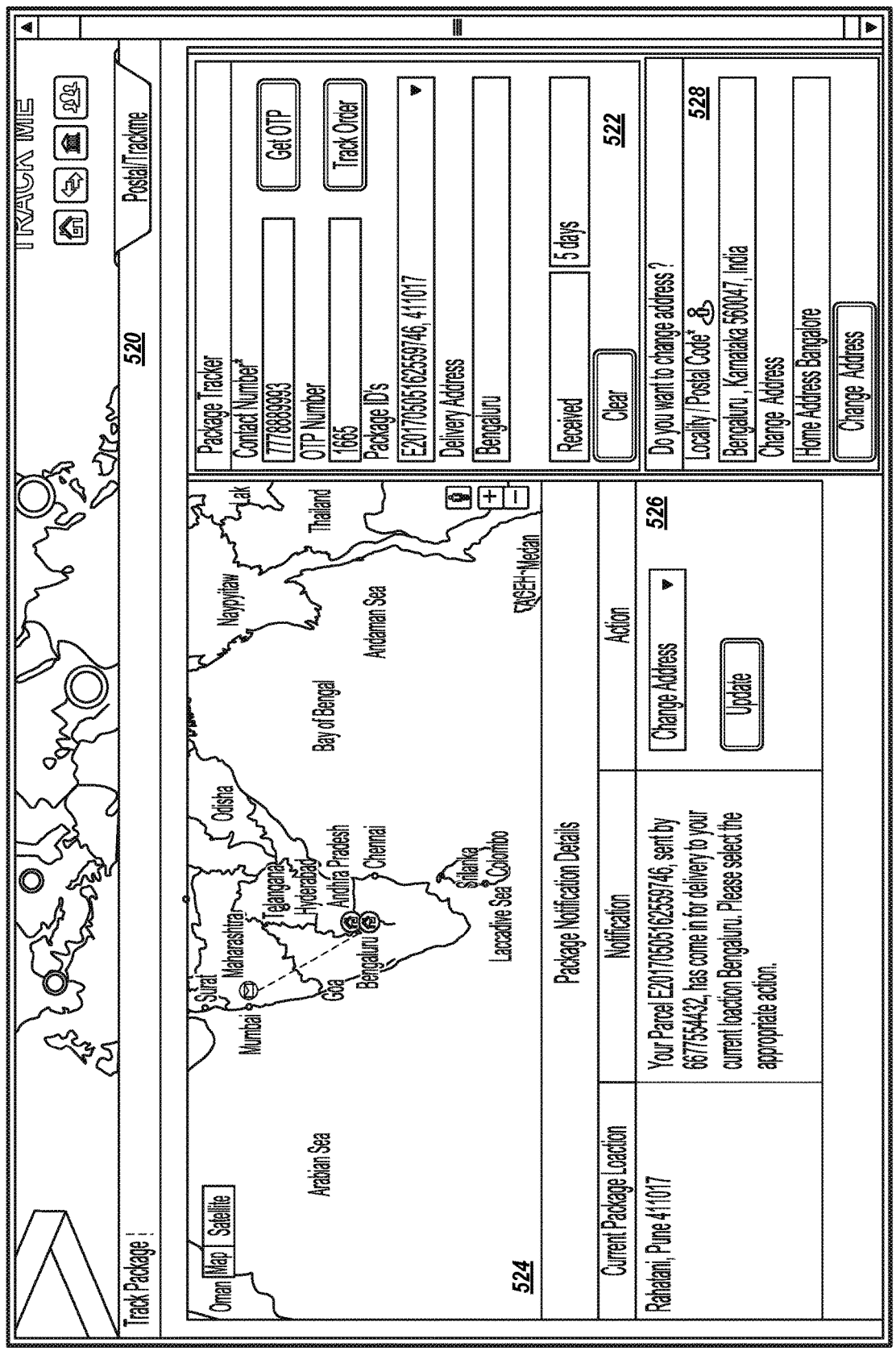
Figure 5I:
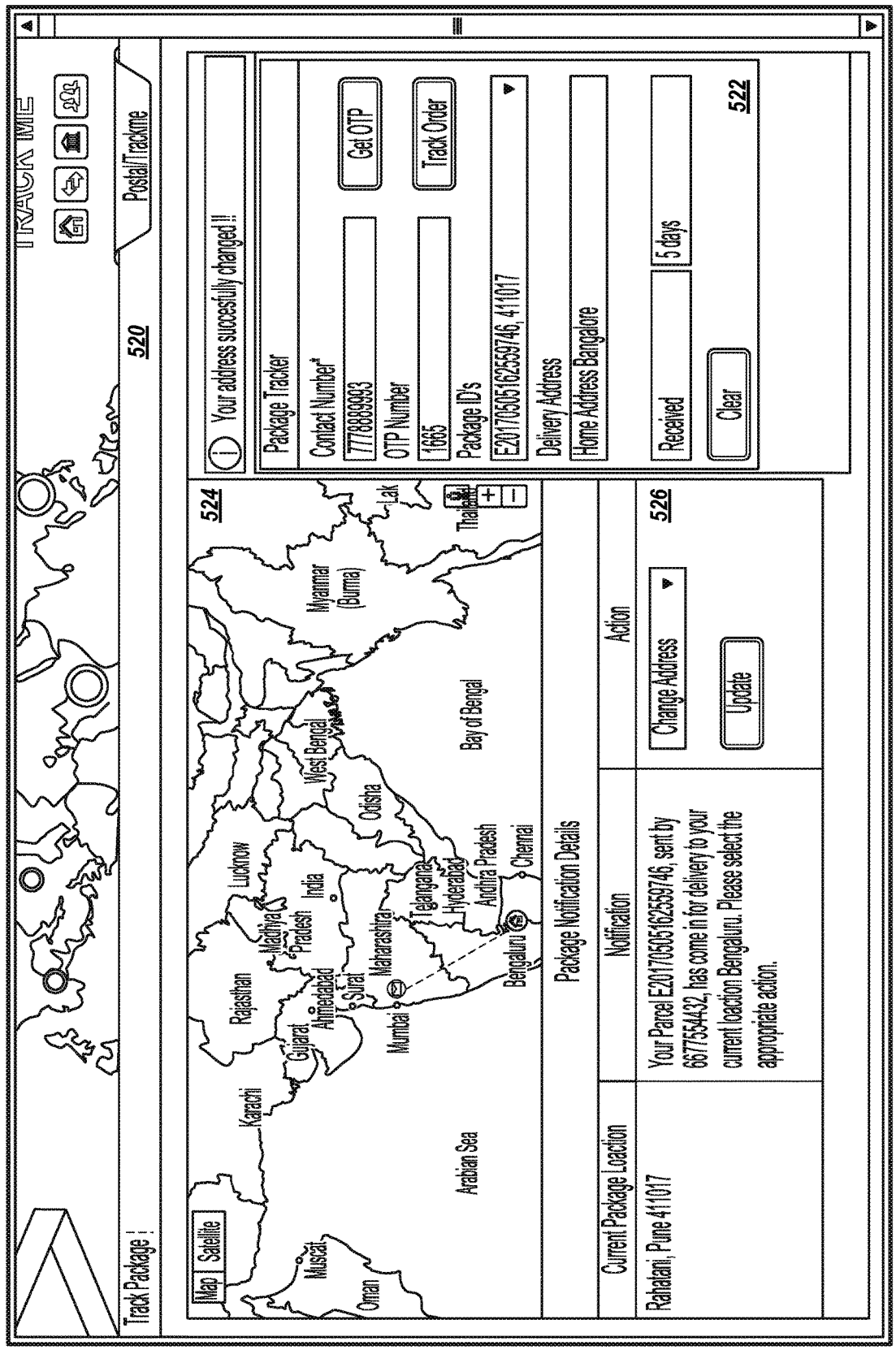
Figure 5J:
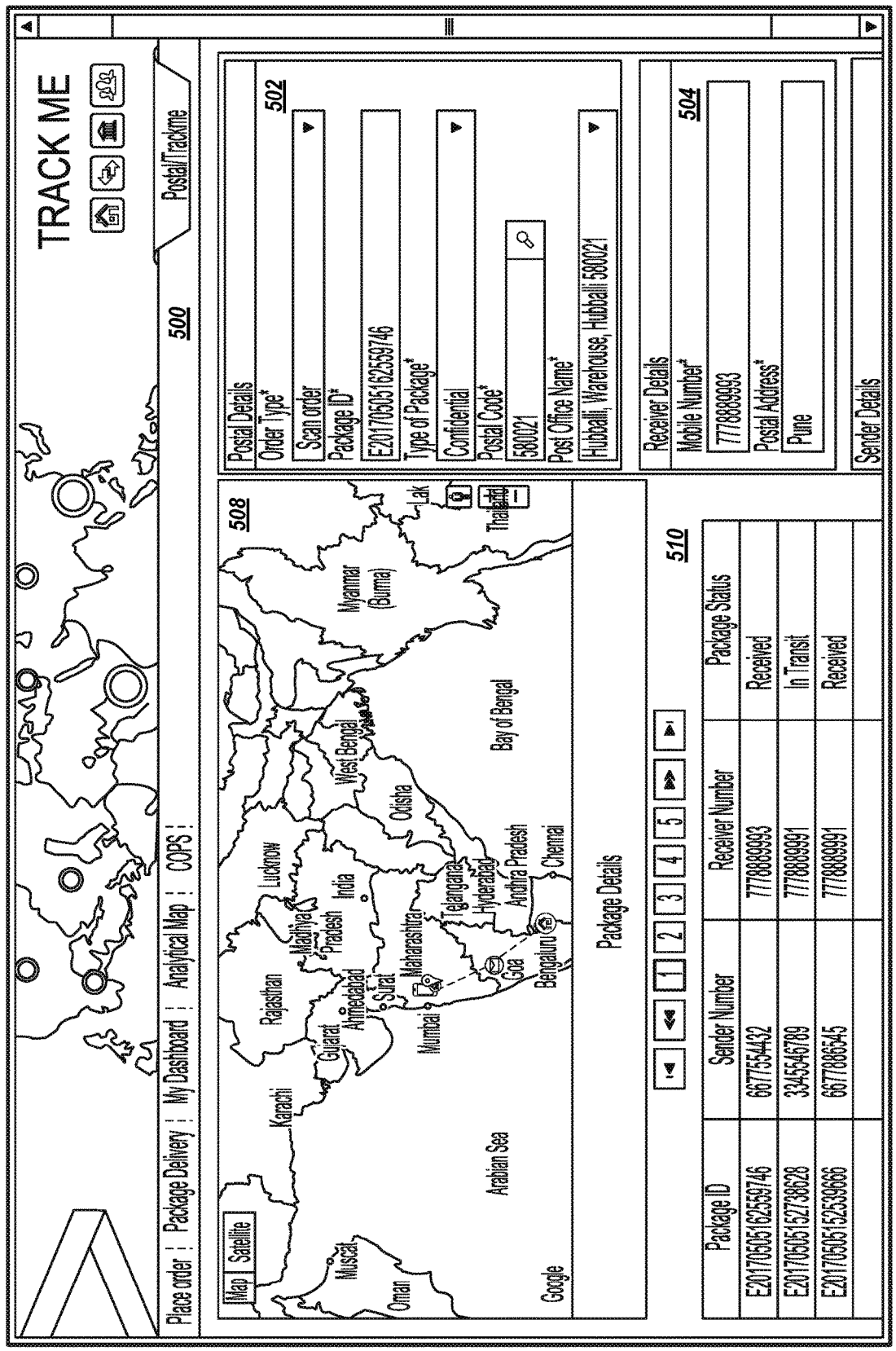
Figure 5K:
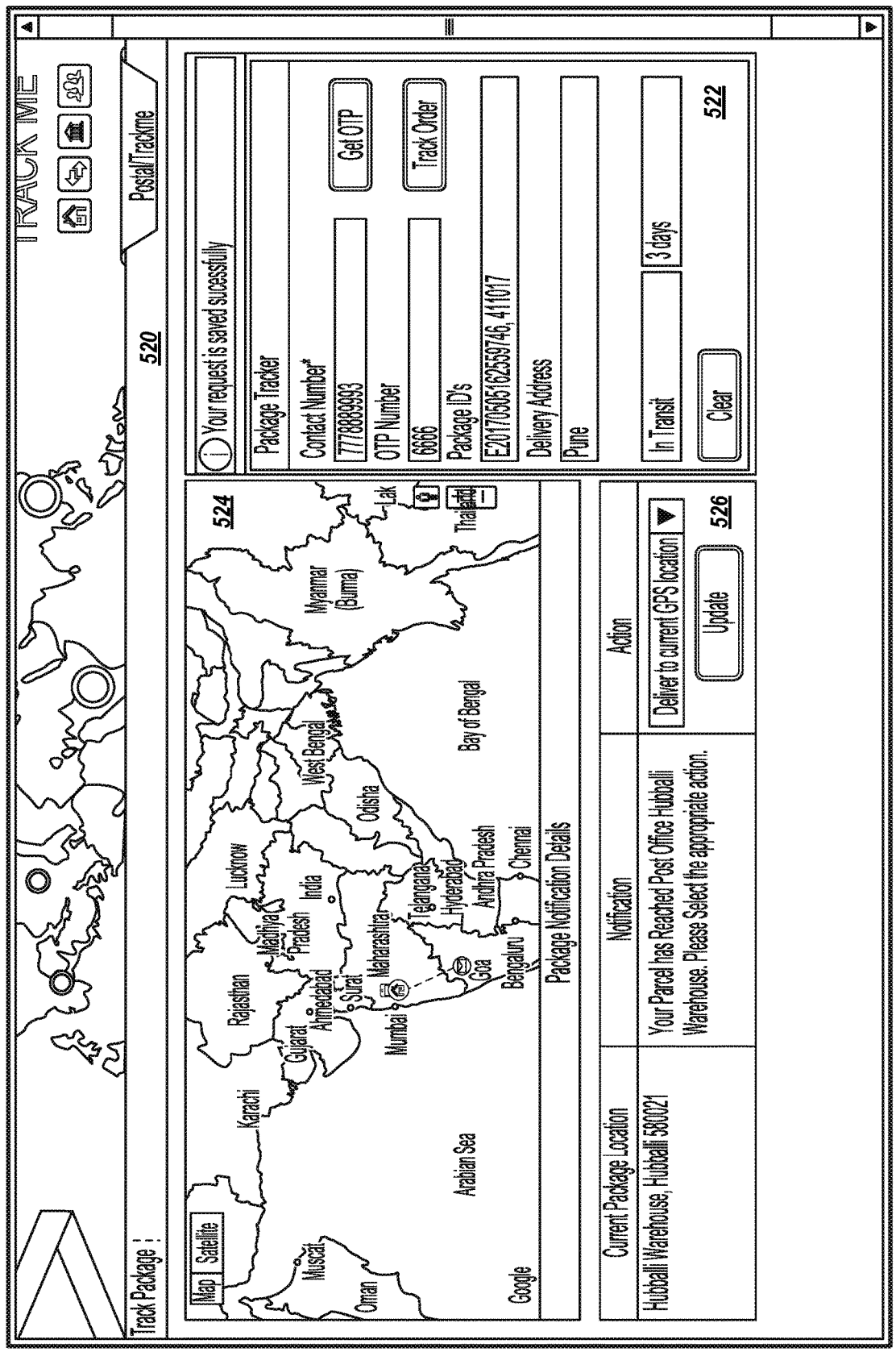
Figure 5L:
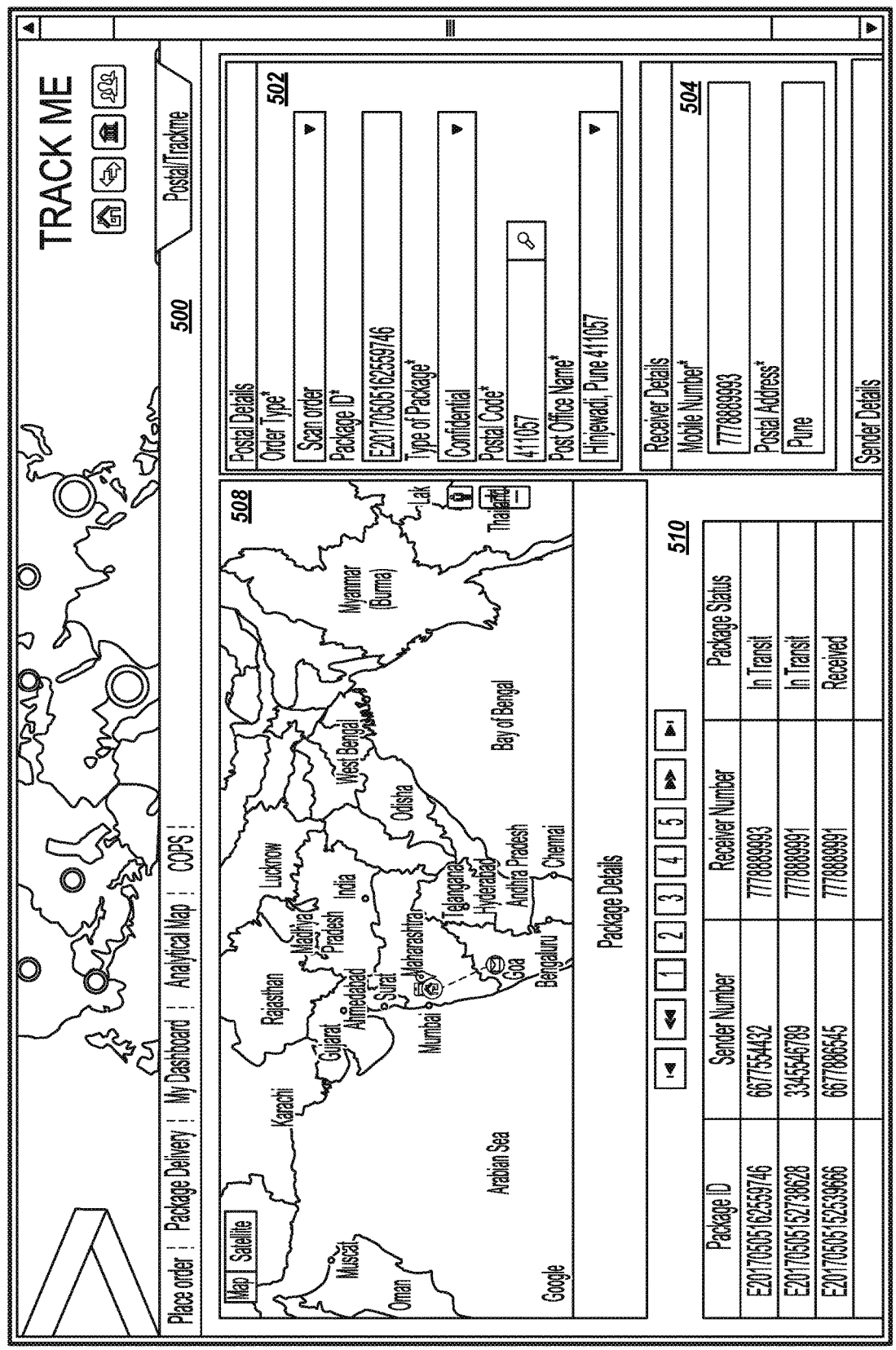
Figure 5M:
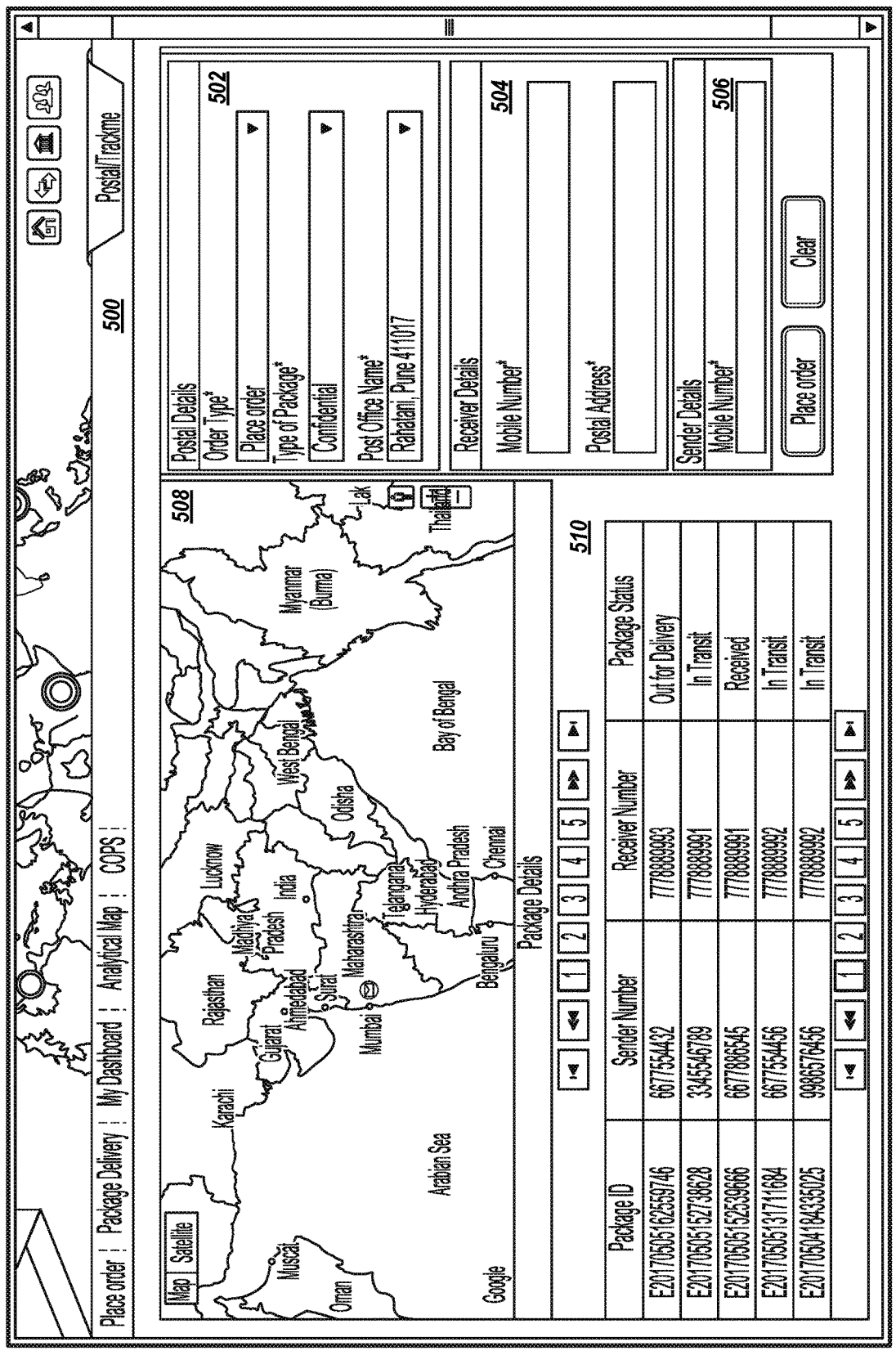
Figure 5N:
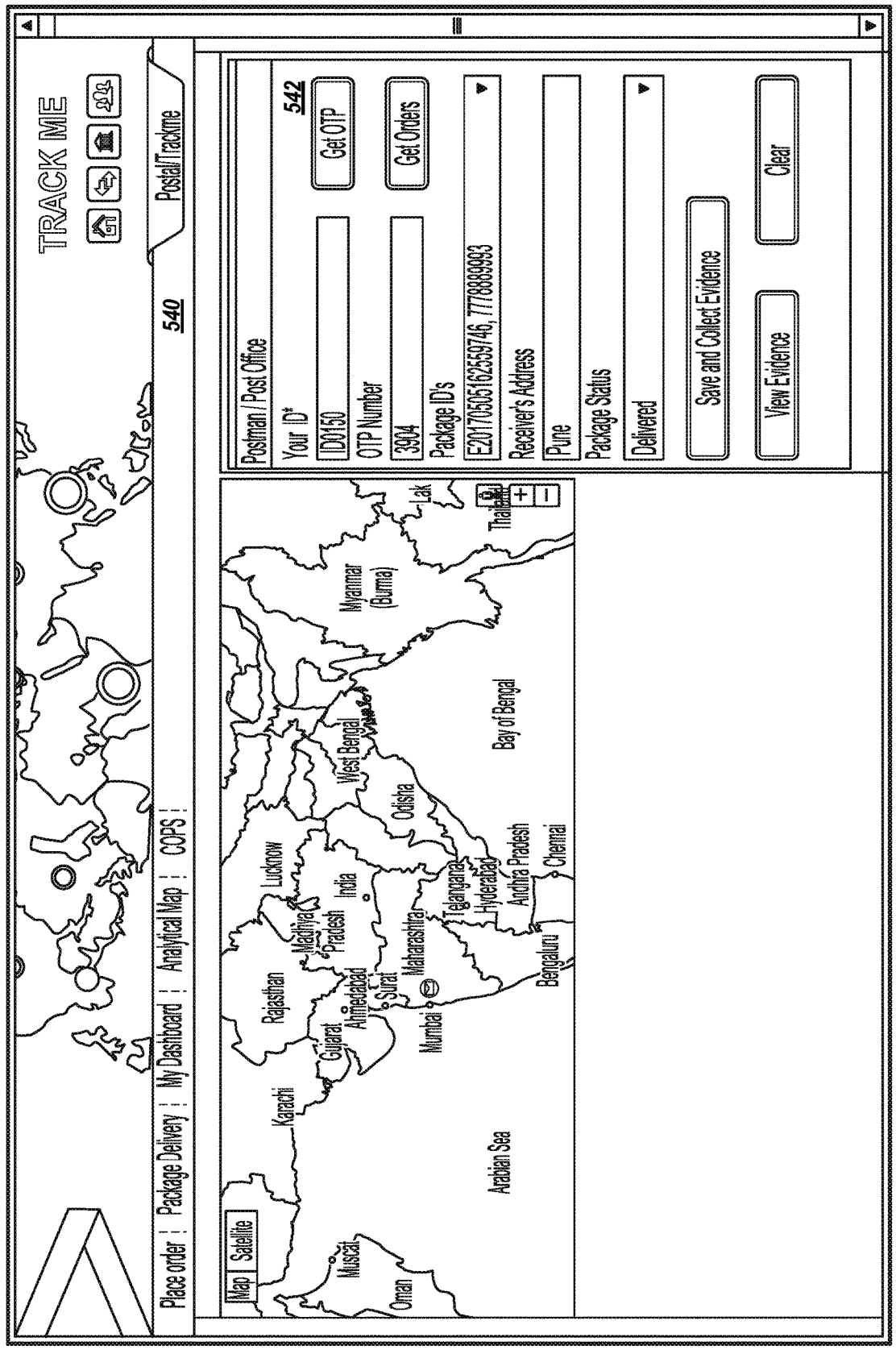
Figure 5O:
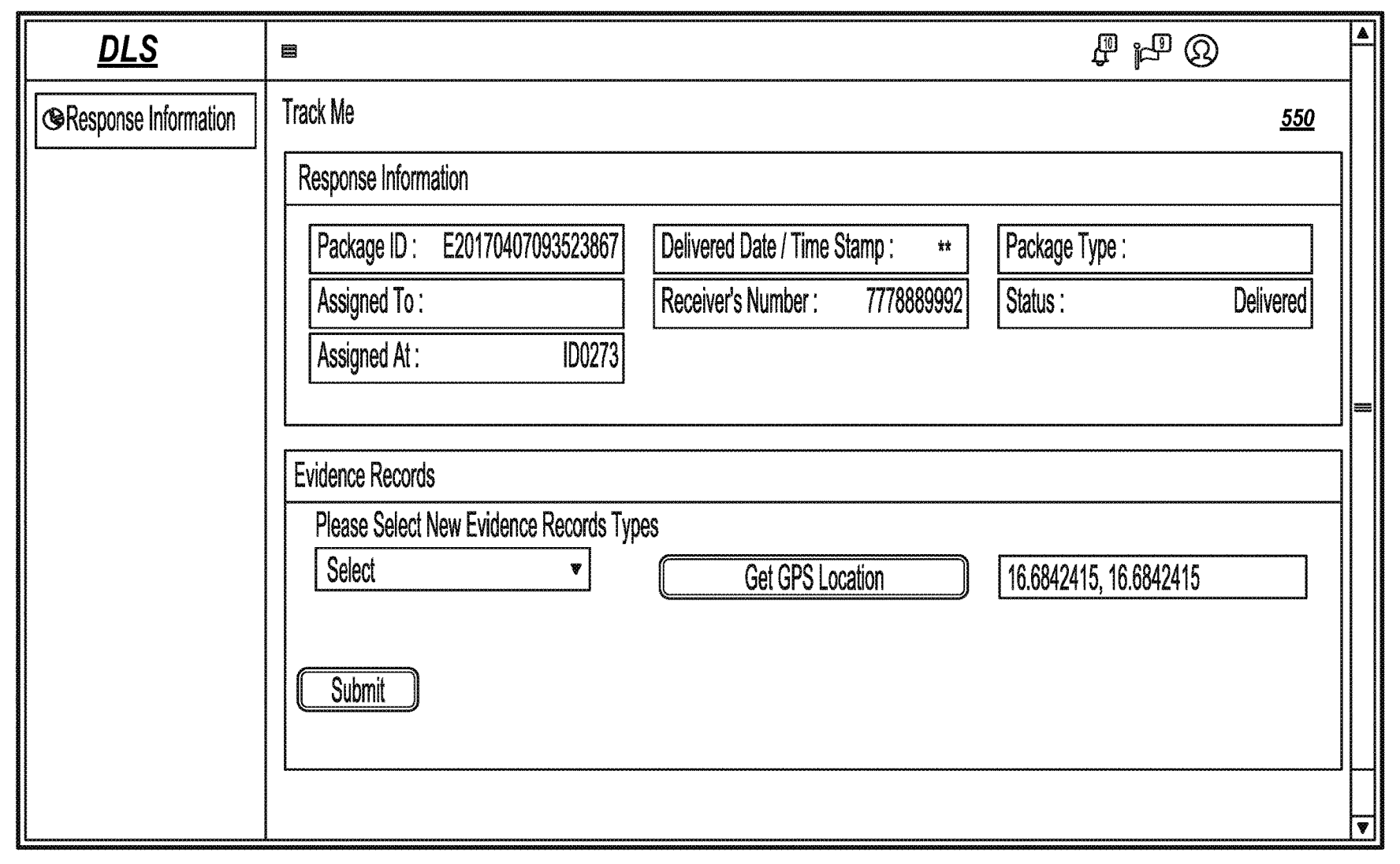
Figure 5P:
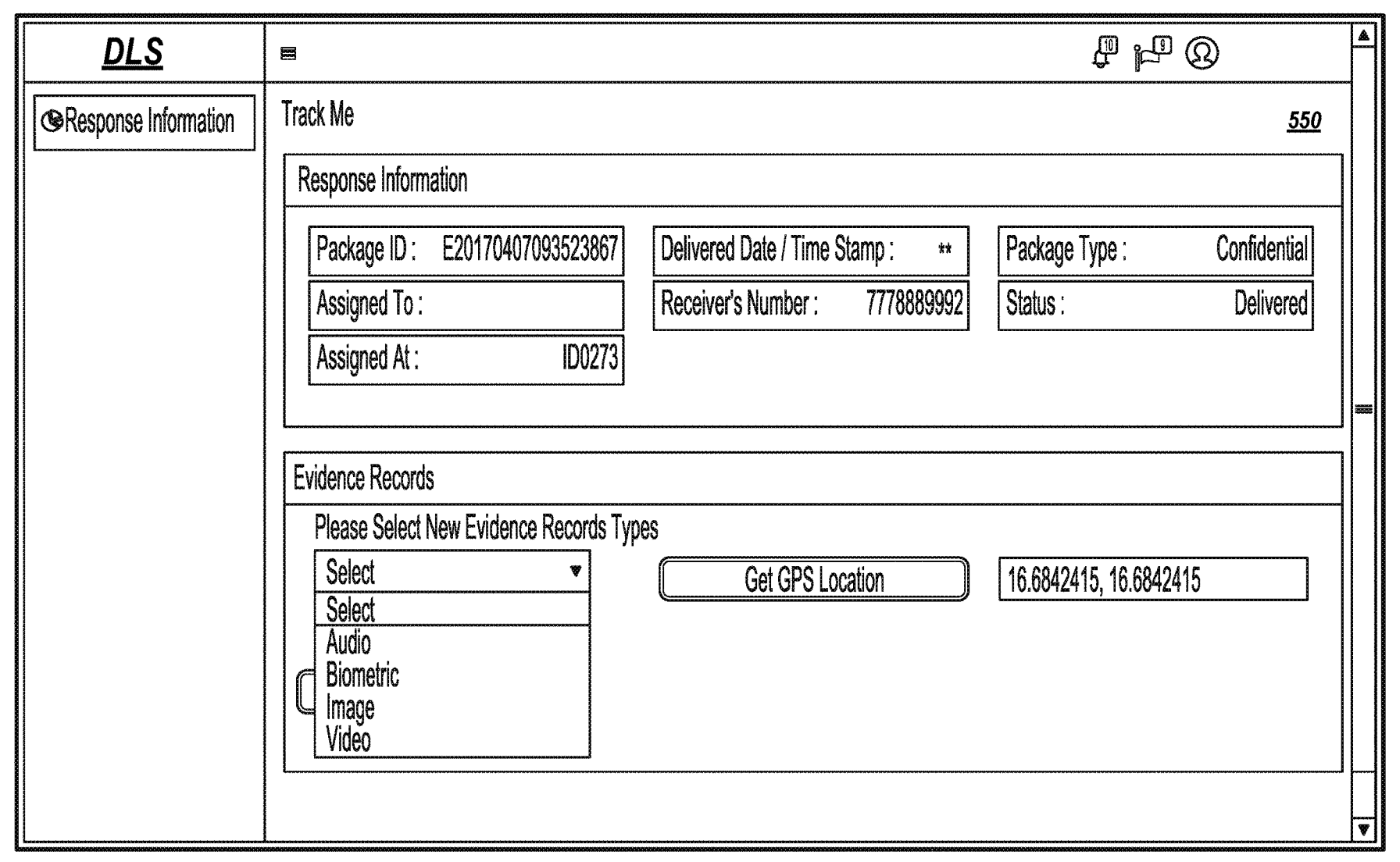
Figure 5Q:
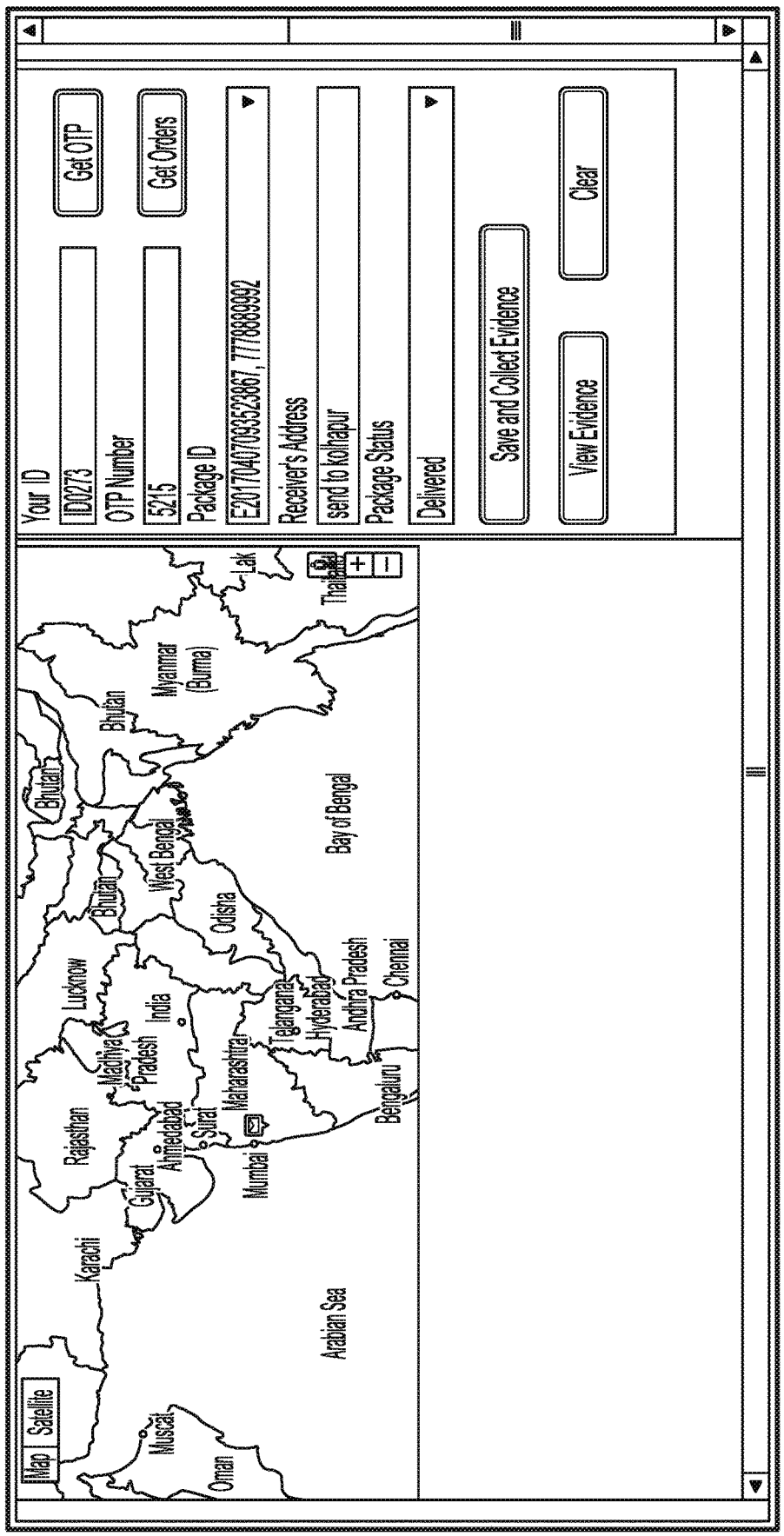
Figure 5R:
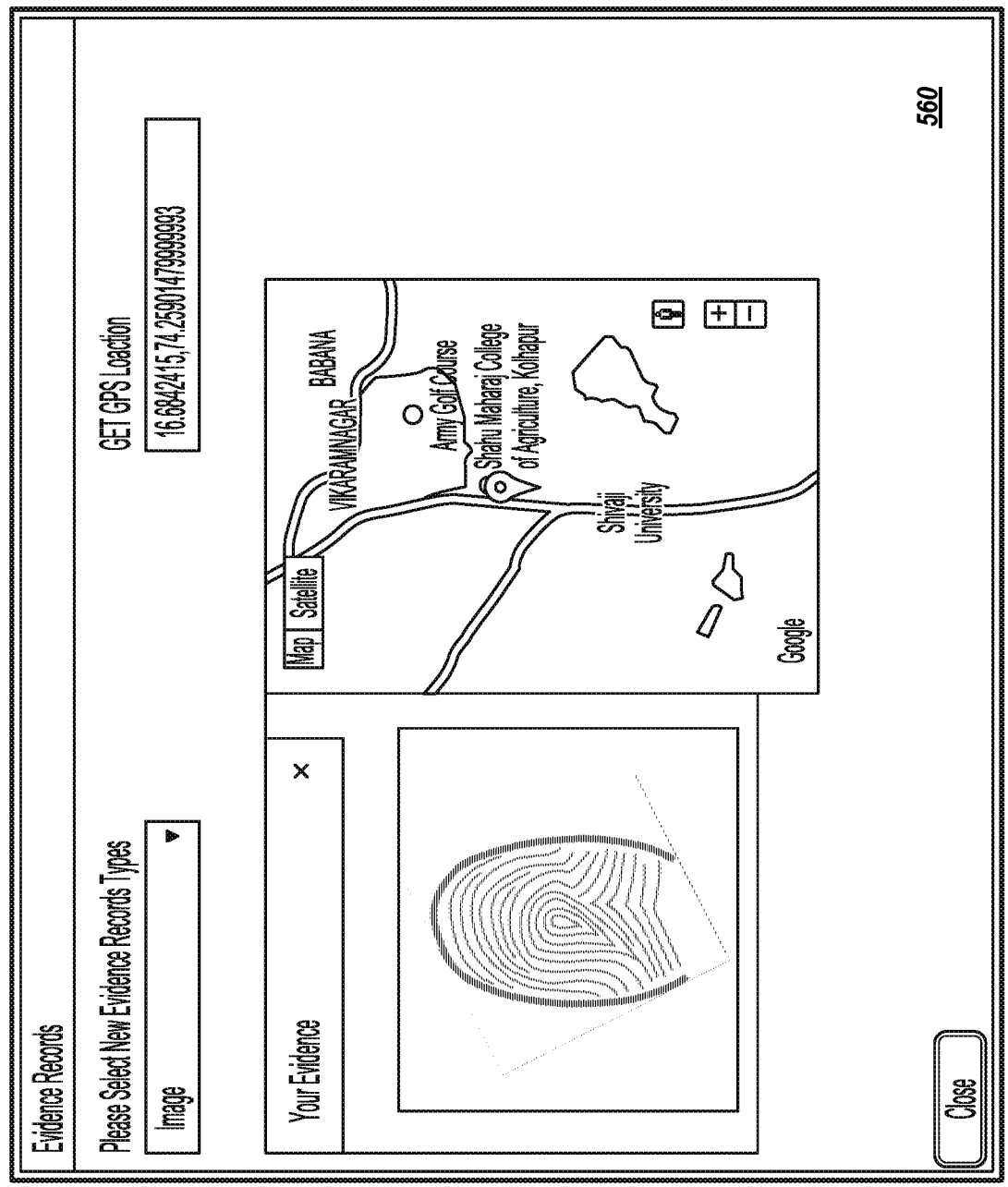

FIGS. 5A-5R depict example graphical user interfaces (GUIs) that can be used in implementations of the present disclosure. In some implementations, the location-based delivery platform includes a portal (e.g., web portal) that can be accessed by users (e.g., senders, agents, recipients). The example GUIs of FIGS. 5A-5R can be provided through the portal.

FIGS. 5A-5D depict an example GUI 500 that can be accessed by a delivery agent (e.g., post man) for managing delivery orders. In some examples, a user (e.g., sender, delivery agent) can use the portal to place a delivery order by inputting delivery details provided by a sender. In the example of FIGS. 5A-5D, the GUI 500 includes a postal details (also referred to as delivery details) section 502, a recipient details section 504, and a sender details section 506. The example GUI 500 also includes a map section 508, and an order summary section 510. In the depicted example, the map section 508 graphically depicts a send from location, and a deliver to location for the delivery order being entered. The order summary section 510 provides a list of placed orders, and their current statuses.

FIGS. 5A-5D depict an example progression for entering and submitting a delivery order using the GUI 500. For example, in FIG. 5A, place order is selected from a drop-down menu of the postal details section 502, and recipient details (e.g., X-digit number; postal address (city)) are input to the recipient details section 504. In FIG. 5B, a type of the package (e.g., confidential, high value, perishable, regular, others) is selected from a drop-down menu of the postal details section 502. In FIG. 5C, the X-digit number of the sender is entered in the sender details section 506. FIG. 5D depicts the GUI 500 after selection of the "place Order" button, which includes updating of the order summary section 510 to include the just placed order, with the status "received."

FIGS. 5E-5I depict an example GUI 520 that can be accessed by a recipient to manage delivery. In some examples, in response to the delivery order being generated, the recipient receives a notification, as described herein. In some examples, the notification can include a uniform resource locator (URL), and log-in information for the portal to enable the recipient to access the GUI 520. The example of FIG. 5E depicts the GUI 520 upon the recipient logging into the portal. The GUI 520 includes a package tracker section 522, a map section 524, and a package notification details section 526. In the example of FIG. 5E, the recipient is informed that a package is to be delivered to their current location (e.g., real-time location as determined by location signals (GPS, wifi)) in the city of Bengaluru (Bangalore), and the recipient is asked to select an action.

FIG. 5F depicts the example GUI 520 in response to recipient selection of a drop-down menu for selecting an action, which drop-down menu includes collecting from post office, deliver to current GPS location, and change address options. In the instant example, the recipient selects the change address option.

FIGS. 5G-5I depict an example progression in response to recipient selection of the change address option in FIG. 5F. More particularly, in response to recipient selection of the change address option, a change address interface 528 is displayed, and enables the recipient to input updated address information, as depicted in FIG. 5H. The recipient selects the change address button, and the change of address is confirmed, as depicted in FIG. 5I.

FIG. 5J depicts the example GUI 500 accessed by the delivery agent. In the example of FIG. 5J, the GUI 500 indicates that the package has been scanned at an intermediary post office, and that the recipient's address has been changed to the city of Pune. For example, the X-digit number has been located in the city of Pune. Consequently, the location-based delivery platform updates the recipient's address to Pune. In response, a notification can be sent to the recipient indicating that the recipient has moved from the last-determined location, and is requested to update the location and/or delivery channel. For example, and with reference to FIG. 5K, the recipient can log into the platform to access the GUI 520, and select, in the depicted example, deliver to current GPS location in Pune, as the channel for delivery. In response, the package is re-routed from the intermediary post office to Pune, in this example.

FIG. 5L depicts the example GUI 500 as updated to indicate that the package was delivered to Pune, and that the package has been received at the post office in Pune. The package is provided to a delivery agent (e.g., postman) located in Pune for physical delivery from the post office in Pune to the recipient. Consequently, the package status is updated to "Out for delivery," as depicted in FIG. 5M. In response to the package being out for delivery (from the Pune post office), the recipient is notified. In some examples, the recipient can log into the platform to access the GUI 520, which provides updated delivery information, such as an identifier assigned to the delivery agent that is delivering the package, as well as an expected time for delivery (e.g., 1 day). In some examples, the recipient can choose a timeslot for delivery (e.g., 8 AM-12 PM, 12 PM-4 PM, 4 PM-8 PM).

Upon locating the recipient (e.g., using location signals informing on the location of the device of the recipient), the delivery agent can log into the platform to collect and save evidence of proof-of-delivery. For example, and with reference to FIG. 5N, a delivery GUI 540 can be displayed, which provides a delivery information section 542. The delivery agent can select a "Save and Collect Evidence" button. For example, the delivery agent can access the platform for display of the delivery GUI using a mobile device (e.g., the user 124 using the device 104 of FIG. 1).

In some implementations, in response to initiating collection and saving of proof-of-delivery evidence, the delivery agent is navigated to one or more DLS interfaces, which enable the delivery agent to collect and store the evidence to the DLS. FIGS. 5O and 5P depict an example DLS GUI 550. In the example of FIGS. 5O and 5P, the delivery agent can select the type of delivery evidence that is to be recorded (e.g., from a drop-down menu). Example types of delivery evidence can include audio, biometric, image, and video. The delivery agent can also retrieve a current GPS location (e.g., the location, at which delivery is being performed). After the delivery has been performed, the package status is changed to delivered (e.g., as depicted in FIG. 5Q). The delivery can be subsequently audited by reviewing the delivery timeline, as well as the recorded proof-of-delivery evidence. For example, and as shown in FIG. 5R, an audit GUI 560 can be provided, which displays, among other information, the evidence records recorded for the delivery. In the depicted example, the evidence includes a thumbprint (e.g., biometric), which is collected (e.g., using a mobile device of the delivery agent), and recorded in the evidence record.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for location-based delivery of a tangible asset, the method being executed by one or more processors and comprising:
    receiving delivery order data for delivery of the tangible asset, the delivery order data comprising a unique identifier associated with a mobile device of a recipient;
    receiving, prior to initiating the delivery of the tangible asset, evidence data from the mobile device of the recipient, the evidence data comprising data representative of one or more physical aspects of the recipient, being recorded by the mobile device of the recipient, and being requested from the recipient in response to the recipient accepting a delivery order;
    providing an order record stored in a distributed ledger system, the order record comprising at least a portion of the delivery order data, and the evidence data;
    determining that the tangible asset received at a distribution point is to be delivered to a real-time location of the recipient, the distribution point being identified for receipt of the tangible asset as a nearest delivery point to a last known location of the recipient based on a location signal of the mobile device of the recipient;

transmitting a notification to the mobile device of the recipient to facilitate delivery of the tangible asset from the distribution point to the real-time location of the recipient determined based on a location of the mobile device of the recipient;

determining that the tangible asset is to be handed over, and in response:
  collecting delivery evidence data,
  providing the delivery evidence data for comparison to the evidence data, and
  receiving a validation result based on the comparison; and selectively indicating that the tangible asset has been handed over to the recipient at least partially based on the validation result, and updating the order record stored in the distributed ledger system.

2. The method of claim 1, further comprising determining that the location of the mobile device of the recipient is within a predefined range of the distribution point, from which the tangible asset is to be delivered, and in response, providing an indication to a delivery agent that the tangible asset is to be delivered to the location.

3. The method of claim 1, further comprising:
performing at least one validation check based on the delivery order data; and
receiving an indication that the at least one validation check has passed, and in response, transmitting a notification to the mobile device of the recipient to confirm the recipient's acceptance of the delivery order.

4. The method of claim 3, wherein the at least one validation check comprises a sender validation, package validation, and recipient validation.

5. The method of claim 1, further comprising, during delivery of the tangible asset, determining that a delivery mode has changed, and in response, updating delivery of the tangible asset to the delivery mode.

6. The method of claim 5, wherein the delivery mode is changed from a fixed address to the location-based delivery.

7. The method of claim 1, wherein the evidence data comprises biometric data that is at least partially unique to the recipient.

8. The method of claim 1, wherein collecting delivery evidence data comprises capturing the delivery evidence data using a mobile device of a delivery agent delivering the tangible asset to the recipient.

9. The method of claim 8, wherein a type of the delivery evidence data is of the same type of the evidence data.

10. A system, comprising:
one or more processors; and
a computer-readable storage device coupled to the one or more processors and having instructions stored thereon which, when executed by the one or more processors, cause the one or more processors to perform operations for location-based delivery of a tangible asset, the operations comprising:
  receiving delivery order data for delivery of the tangible asset, the delivery order data comprising a unique identifier associated with a mobile device of a recipient;
  receiving, prior to initiating the delivery of the tangible asset, evidence data from the mobile device of the recipient, the evidence data comprising data representative of one or more physical aspects of the recipient, being recorded by the mobile device of the recipient, and being requested from the recipient in response to the recipient accepting a delivery order;
  providing an order record stored in a distributed ledger system, the order record comprising at least a portion of the delivery order data, and the evidence data;
  determining that the tangible asset received at a distribution point is to be delivered to a real-time location of the recipient, the distribution point being identified for receipt of the tangible asset as a nearest delivery point to a last known location of the recipient based on a location signal of the mobile device of the recipient;
  transmitting a notification to the mobile device of the recipient to facilitate delivery of the tangible asset from the distribution point to the real-time location of the recipient determined based on a location of the mobile device of the recipient;
  determining that the tangible asset is to be handed over, and in response:
    collecting delivery evidence data,
    providing the delivery evidence data for comparison to the evidence data, and
    receiving a validation result based on the comparison; and
  selectively indicating that the tangible asset has been handed over to the recipient at least partially based on the validation result, and updating the order record stored in the distributed ledger system.

11. The system of claim 10, wherein operations further comprise determining that the location of the mobile device of the recipient is within a predefined range of the distribution point, from which the tangible asset is to be delivered, and in response, providing an indication to a delivery agent that the tangible asset is to be delivered to the location.

12. The system of claim 10, wherein operations further comprise:
performing at least one validation check based on the delivery order data; and
receiving an indication that the at least one validation check has passed, and in response, transmitting a notification to the mobile device of the recipient to confirm the recipient's acceptance of the delivery order.

13. The system of claim 12, wherein the at least one validation check comprises a sender validation, package validation, and recipient validation.

14. The system of claim 10, wherein operations further comprise, during delivery of the tangible asset, determining that a delivery mode has changed, and in response, updating delivery of the tangible asset to the delivery mode.

15. The system of claim 14, wherein the delivery mode is changed from a fixed address to the location-based delivery.

16. The system of claim 10, wherein the evidence data comprises biometric data that is at least partially unique to the recipient.

17. The system of claim 10, wherein collecting delivery evidence data comprises capturing the delivery evidence data using a mobile device of a delivery agent delivering the tangible asset to the recipient.

18. The system of claim 17, wherein a type of the delivery evidence data is of the same type of the evidence data.

19. A non-transitory, computer-readable storage media coupled to one or more processors and having instructions stored thereon which, when executed by the one or more processors, cause the one or more processors to perform operations for location-based delivery of a tangible asset, the operations comprising:

receiving delivery order data for delivery of the tangible asset, the delivery order data comprising a unique identifier associated with a mobile device of a recipient;

receiving, prior to initiating the delivery of the tangible asset, evidence data from the mobile device of the recipient, the evidence data comprising data representative of one or more physical aspects of the recipient, being recorded by the mobile device of the recipient, and being requested from the recipient in response to the recipient accepting a delivery order;

providing an order record stored in a distributed ledger system, the order record comprising at least a portion of the delivery order data, and the evidence data;

determining that the tangible asset received at a distribution point is to be delivered to a real-time location of the recipient, the distribution point being identified for receipt of the tangible asset as a nearest delivery point to a last known location of the recipient based on a location signal of the mobile device of the recipient;

transmitting a notification to the mobile device of the recipient to facilitate delivery of the tangible asset from the distribution point to the real-time location of the recipient determined based on a location of the mobile device of the recipient;

determining that the tangible asset is to be handed over, and in response:
 collecting delivery evidence data,
 providing the delivery evidence data for comparison to the evidence data, and
 receiving a validation result based on the comparison; and selectively indicating that the tangible asset has been handed over to the recipient at least partially based on the validation result, and updating the order record stored in the distributed ledger system.

20. The computer-readable storage media of claim 19, wherein operations further comprise determining that the location of the mobile device of the recipient is within a predefined range of the distribution point, from which the tangible asset is to be delivered, and in response, providing an indication to a delivery agent that the tangible asset is to be delivered to the location.

21. The computer-readable storage media of claim 19, wherein operations further comprise:
 performing at least one validation check based on the delivery order data; and
 receiving an indication that the at least one validation check has passed, and in response, transmitting a notification to the mobile device of the recipient to confirm the recipient's acceptance of the delivery order.

22. The computer-readable storage media of claim 21, wherein the at least one validation check comprises a sender validation, package validation, and recipient validation.

23. The computer-readable storage media of claim 19, wherein operations further comprise, during delivery of the tangible asset, determining that a delivery mode has changed, and in response, updating delivery of the tangible asset to the delivery mode.

24. The computer-readable storage media of claim 23, wherein the delivery mode is changed from a fixed address to the location-based delivery.

25. The computer-readable storage media of claim 19, wherein the evidence data comprises biometric data that is at least partially unique to the recipient.

26. The computer-readable storage media of claim 19, wherein collecting delivery evidence data comprises capturing the delivery evidence data using a mobile device of a delivery agent delivering the tangible asset to the recipient.

27. The computer-readable storage media of claim 26, wherein a type of the delivery evidence data is of the same type of the evidence data.

\* \* \* \* \*